US011711810B1

(12) United States Patent
Guieu et al.

(10) Patent No.: US 11,711,810 B1
(45) Date of Patent: *Jul. 25, 2023

(54) SYSTEM, SECURITY AND NETWORK MANAGEMENT USING SELF-ORGANIZING COMMUNICATION ORBITS IN DISTRIBUTED NETWORKS

(71) Applicant: Tanium Inc., Emeryville, CA (US)

(72) Inventors: Thomas R. Guieu, San Francisco, CA (US); Matthew C. Hauck, Pleasant Hill, CA (US); Jason E. Mealins, Berkeley, CA (US); David Hindawi, Berkeley, CA (US); Orion Hindawi, Berkeley, CA (US); Lisa Lippincott, Berkeley, CA (US); Peter Lincroft, Albany, CA (US)

(73) Assignee: TANIUM INC., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,686

(22) Filed: Nov. 8, 2021

Related U.S. Application Data

(63) Continuation of application No. 16/854,844, filed on Apr. 21, 2020, now Pat. No. 11,172,470, which is a (Continued)

(51) Int. Cl.
*H04W 72/20* (2023.01)
*H04W 48/16* (2009.01)
(Continued)

(52) U.S. Cl.
CPC ............. *H04W 72/20* (2023.01); *H04L 41/04* (2013.01); *H04L 41/044* (2013.01);
(Continued)

(58) Field of Classification Search
None
See application file for complete search history.

(56) References Cited

U.S. PATENT DOCUMENTS 5,220,596 A 6/1993 Patel
5,842,202 A 11/1998 Kon
(Continued)

FOREIGN PATENT DOCUMENTS

EP 1553747 A1 7/2005
EP 2493118 A1 8/2012

OTHER PUBLICATIONS

Ion Stoica, Robert Morris, David Karger, M. Frans Kaashoek and Hari Balakrishnan, Chord: A Scalable Peertopeer Lookup Service for Internet Applications, pp. 1-12 (Year: 2001).*
(Continued)

*Primary Examiner* — Christopher M Crutchfield
(74) *Attorney, Agent, or Firm* — Morgan, Lewis & Bockius LLP

(57) ABSTRACT

A method is provided of managing a non-static collection of machines. A first client machine runs a first communication protocol. The non-static collection of machines includes a first linear communication orbit, the first linear communication orbit comprising a sequence of machines that run the first communication protocol, and a second linear communication orbit, the second linear communication orbit comprising a sequence of machines that run a second communication protocol distinct from the first communication protocol. The first client machine receives an instruction from a server to install the second communication protocol, installs the second communication protocol, and then submits a registration request to the server. The first client machine receives, from the server, contact information of a list of potential neighbors. The first client machine then,
(Continued)

proactively constructs and maintains a respective local segment of the second linear communication orbit.

28 Claims, 8 Drawing Sheets

Related U.S. Application Data continuation-in-part of application No. 16/194,240, filed on Nov. 16, 2018, now Pat. No. 10,674,486, which is a continuation of application No. 15/004,757, filed on Jan. 22, 2016, now Pat. No. 10,136,415, which is a continuation of application No. 13/797,946, filed on Mar. 12, 2013, now Pat. No. 9,246,977.

(60) Provisional application No. 62/873,796, filed on Jul. 12, 2019, provisional application No. 61/774,106, filed on Mar. 7, 2013, provisional application No. 61/745,236, filed on Dec. 21, 2012.

(51) Int. Cl.

| | | |
|---|---|---|
| *H04W 24/02* | (2009.01) | |
| *H04W 8/00* | (2009.01) | |
| *H04L 61/00* | (2022.01) | |
| *H04L 9/40* | (2022.01) | |
| *H04L 67/104* | (2022.01) | |
| *H04L 41/0893* | (2022.01) | |
| *H04L 67/1061* | (2022.01) | |
| *H04L 43/02* | (2022.01) | |
| *H04L 41/04* | (2022.01) | |
| *H04L 41/044* | (2022.01) | |
| *H04L 45/02* | (2022.01) | |
| *H04L 41/12* | (2022.01) | |
| *H04L 67/02* | (2022.01) | |
| *H04L 43/04* | (2022.01) | |
| *H04W 84/18* | (2009.01) | |
| *H04L 43/10* | (2022.01) | |
| *H04L 43/0817* | (2022.01) | |
| *H04L 41/082* | (2022.01) | |

(52) U.S. Cl.
CPC .......... *H04L 41/0893* (2013.01); *H04L 41/12* (2013.01); *H04L 43/02* (2013.01); *H04L 43/04* (2013.01); *H04L 45/02* (2013.01); *H04L 61/00* (2013.01); *H04L 63/00* (2013.01); *H04L 67/02* (2013.01); *H04L 67/104* (2013.01); *H04L 67/1046* (2013.01); *H04L 67/1048* (2013.01); *H04L 67/1063* (2013.01); *H04L 67/1065* (2013.01); *H04L 67/1072* (2013.01); *H04W 8/005* (2013.01); *H04W 24/02* (2013.01); *H04W 48/16* (2013.01); *H04L 41/082* (2013.01); *H04L 43/0817* (2013.01); *H04L 43/10* (2013.01); *H04L 63/20* (2013.01); *H04W 84/18* (2013.01)

(56) References Cited

U.S. PATENT DOCUMENTS

| | | |
|---|---|---|
| 5,949,755 A | 9/1999 | Uphadya et al. |
| 6,049,828 A | 4/2000 | Dev et al. |
| 6,615,213 B1 | 9/2003 | Johnson |
| 6,879,979 B2 | 4/2005 | Hindawi et al. |
| 6,885,644 B1 | 4/2005 | Knop et al. |
| 6,959,000 B1 | 10/2005 | Lee et al. |
| 7,043,550 B2 | 5/2006 | Knop et al. |
| 7,096,503 B1 | 8/2006 | Magdych |
| 7,120,693 B2 | 10/2006 | Chang et al. |
| 7,225,243 B1 | 5/2007 | Wilson |
| 7,240,044 B2 | 7/2007 | Chaudhuri et al. |
| 7,299,047 B2 | 11/2007 | Dolan et al. |
| 7,555,545 B2 | 6/2009 | McCasland |
| 7,600,018 B2 | 10/2009 | Maekawa et al. |
| 7,698,453 B2 | 4/2010 | Samuels et al. |
| 7,720,641 B2 | 5/2010 | Alagappan et al. |
| 7,761,557 B2 | 7/2010 | Fellenstein et al. |
| 7,769,848 B2 | 8/2010 | Choy et al. |
| 7,844,687 B1 | 11/2010 | Gelvin et al. |
| 8,078,668 B2 | 12/2011 | Moreau |
| 8,086,729 B1 | 12/2011 | Hindawi et al. |
| 8,139,508 B1 | 3/2012 | Roskind |
| 8,185,612 B1 | 5/2012 | Arolovitch et al. |
| 8,185,615 B1 | 5/2012 | McDysan et al. |
| 8,271,522 B2 | 9/2012 | Mehul et al. |
| 8,392,530 B1 | 3/2013 | Manapragada et al. |
| 8,477,660 B2 | 7/2013 | Lee et al. |
| 8,504,879 B2 | 8/2013 | Poletto et al. |
| 8,510,562 B2 | 8/2013 | Ramakrishnan et al. |
| 8,813,228 B2 | 8/2014 | Magee et al. |
| 8,819,769 B1 | 8/2014 | Van Dijk |
| 8,885,521 B2 | 11/2014 | Wang et al. |
| 8,903,973 B1 | 12/2014 | Hindawi et al. |
| 8,904,039 B1 | 12/2014 | Hindawi et al. |
| 9,009,827 B1 | 4/2015 | Albertson et al. |
| 9,059,961 B2 | 6/2015 | Hindawi et al. |
| 9,246,977 B2 | 1/2016 | Hindawi et al. |
| 9,609,007 B1 | 3/2017 | Rivlin et al. |
| 9,667,738 B2 | 5/2017 | Hindawi et al. |
| 9,716,649 B2 | 7/2017 | Bent et al. |
| 9,769,037 B2 | 9/2017 | Hindawi et al. |
| 9,800,603 B1 | 10/2017 | Sidagni et al. |
| 9,985,982 B1 | 5/2018 | Bartos et al. |
| 10,095,864 B2 | 10/2018 | Hunt et al. |
| 10,136,415 B2 | 11/2018 | Hindawi et al. |
| 10,261,770 B2 | 4/2019 | Devagupthapu et al. |
| 10,482,242 B2 | 11/2019 | Hunt et al. |
| 10,484,429 B1 | 11/2019 | Fawcett |
| 10,498,744 B2 | 12/2019 | Hunt et al. |
| 10,795,906 B1 | 10/2020 | Teubner |
| 10,824,729 B2 | 11/2020 | Hoscheit et al. |
| 10,929,345 B2 | 2/2021 | Stoddard et al. |
| 11,153,383 B2 | 10/2021 | Richards et al. |
| 2001/0056461 A1 | 12/2001 | Kampe et al. |
| 2002/0007404 A1 | 1/2002 | Vange et al. |
| 2002/0042693 A1 | 4/2002 | Kampe et al. |
| 2002/0073086 A1 | 6/2002 | Thompson et al. |
| 2002/0198867 A1 | 12/2002 | Lohman et al. |
| 2003/0101253 A1 | 5/2003 | Saito et al. |
| 2003/0131044 A1 | 7/2003 | Nagendra et al. |
| 2003/0212676 A1 | 11/2003 | Bruce et al. |
| 2003/0212821 A1 | 11/2003 | Gillies et al. |
| 2004/0076164 A1 | 4/2004 | Vanderveen et al. |
| 2004/0190085 A1 | 9/2004 | Silverbrook et al. |
| 2005/0004907 A1 | 1/2005 | Bruno et al. |
| 2005/0108356 A1 | 5/2005 | Rosu et al. |
| 2005/0108389 A1 | 5/2005 | Kempin et al. |
| 2005/0195755 A1 | 9/2005 | Senta et al. |
| 2006/0039371 A1 | 2/2006 | Castro et al. |
| 2006/0128406 A1 | 6/2006 | Macartney |
| 2007/0005738 A1 | 1/2007 | Alexion-Tiernan et al. |
| 2007/0171844 A1 | 7/2007 | Loyd et al. |
| 2007/0211651 A1 | 9/2007 | Ahmed et al. |
| 2007/0230482 A1 | 10/2007 | Shim et al. |
| 2008/0082628 A1 | 4/2008 | Rowstron et al. |
| 2008/0133582 A1 | 6/2008 | Andersch et al. |
| 2008/0258880 A1 | 10/2008 | Smith et al. |
| 2008/0263031 A1 | 10/2008 | George et al. |
| 2008/0288646 A1 | 11/2008 | Hasha et al. |
| 2009/0125639 A1 | 5/2009 | Dam et al. |
| 2009/0271360 A1 | 10/2009 | Bestgen et al. |
| 2009/0285204 A1 | 11/2009 | Gallant et al. |
| 2009/0319503 A1 | 12/2009 | Mehul et al. |
| 2009/0328115 A1 | 12/2009 | Malik |
| 2010/0011060 A1* | 1/2010 | Hilterbrand ............ G06F 8/65 709/204 |
| 2010/0070570 A1 | 3/2010 | Lepeska |
| 2010/0085948 A1 | 4/2010 | Yu et al. |
| 2010/0094862 A1 | 4/2010 | Bent et al. |

(56) References Cited

U.S. PATENT DOCUMENTS

| | | |
|---|---|---|
| 2010/0296416 A1 | 11/2010 | Lee et al. |
| 2010/0306252 A1 | 12/2010 | Jarvis et al. |
| 2011/0231431 A1 | 9/2011 | Kamiwada et al. |
| 2011/0271319 A1 | 11/2011 | Venable, Sr. |
| 2012/0053957 A1 | 3/2012 | Atkins |
| 2012/0110183 A1 | 5/2012 | Miranda et al. |
| 2012/0269096 A1 | 10/2012 | Roskind |
| 2013/0110931 A1 | 5/2013 | Kim et al. |
| 2013/0170336 A1 | 7/2013 | Chen et al. |
| 2013/0276053 A1 | 10/2013 | Hugard, IV et al. |
| 2013/0326494 A1* | 12/2013 | Nunez ............... H04L 41/0893 717/172 |
| 2014/0075505 A1 | 3/2014 | Subramanian |
| 2014/0101133 A1 | 4/2014 | Carston et al. |
| 2014/0149557 A1 | 5/2014 | Lohmar et al. |
| 2014/0164552 A1 | 6/2014 | Kim et al. |
| 2014/0181247 A1 | 6/2014 | Hindawi et al. |
| 2014/0181295 A1 | 6/2014 | Hindawi et al. |
| 2014/0244727 A1 | 8/2014 | Kang et al. |
| 2014/0280280 A1 | 9/2014 | Singh |
| 2014/0375528 A1 | 12/2014 | Ling |
| 2015/0080039 A1 | 3/2015 | Ling et al. |
| 2015/0149624 A1 | 5/2015 | Hindawi et al. |
| 2015/0163121 A1 | 6/2015 | Mahaffey et al. |
| 2015/0172228 A1 | 6/2015 | Zalepa et al. |
| 2015/0256575 A1 | 9/2015 | Scott |
| 2015/0372911 A1 | 12/2015 | Yabusaki et al. |
| 2015/0373043 A1 | 12/2015 | Wang et al. |
| 2016/0080408 A1 | 3/2016 | Coleman et al. |
| 2016/0119251 A1 | 4/2016 | Solis et al. |
| 2016/0269434 A1 | 9/2016 | DiValentin et al. |
| 2016/0286540 A1 | 9/2016 | Hindawi et al. |
| 2016/0352588 A1 | 12/2016 | Subbarayan et al. |
| 2016/0360006 A1 | 12/2016 | Hopkins et al. |
| 2017/0118074 A1 | 4/2017 | Feinstein et al. |
| 2017/0286690 A1 | 10/2017 | Chari |
| 2017/0346824 A1 | 11/2017 | Mahabir |
| 2018/0013768 A1 | 1/2018 | Hunt et al. |
| 2018/0039486 A1 | 2/2018 | Kulkami et al. |
| 2018/0074796 A1 | 3/2018 | Alabes et al. |
| 2018/0191747 A1 | 7/2018 | Nachenberg et al. |
| 2018/0267794 A1 | 9/2018 | Atchison et al. |
| 2018/0351792 A1 | 12/2018 | Hunter et al. |
| 2018/0351793 A1 | 12/2018 | Hunter et al. |
| 2019/0081981 A1 | 3/2019 | Bansal |
| 2019/0280867 A1 | 9/2019 | Kurian |
| 2019/0319987 A1 | 10/2019 | Levy |
| 2020/0028890 A1 | 1/2020 | White et al. |
| 2020/0053072 A1 | 2/2020 | Glozman et al. |
| 2020/0195693 A1 | 6/2020 | Price |
| 2020/0198867 A1 | 6/2020 | Nakamichi |
| 2020/0304536 A1 | 9/2020 | Mahabir |

OTHER PUBLICATIONS

Abdalkarim Awad et al., Virtual Cord Protocol (VCP): A Flexible DHT-like Routing Service for Sensor Networks, In Proceedings of the 5th IEEE International Conference on Mobile Ad Hoc and Sensor Systems, 2008, 10 pp. 133-142.

Hood, Proactive Network-Fault Detection, Sep. 1997, 9 pages.

Mongeau, D., et al., "Ensuring integrity of network inventory and configuration data," Telecommunications Network Strategy and Planning Symposium, Networks 2004, 11th International Vienna, Austria, Jun. 13-16, 2004, 6 pgs.

Weixiong Rao et al., "Optimal Resource Placement in Structured Peer-to-Peer Networks," Jul. 2010, IEEE Transactions on Parallel and Distributed Systems, vol. 21, No. 7, 16 pgs.

Tanium Inc., International Search Report and Written Opinion, PCT/US2013/076971, dated Apr. 4, 2014, 17 pgs.

Tanium Inc., International Preliminary Report on Patentability, PCT/US2013/076971, dated Jun. 23, 2015, 14 pgs.

Tanium Inc., International Search Report and Written Opinion, PCT/US2014/067607, dated Feb. 18, 2015, 15 pgs.

Tanium Inc., International Preliminary Report on Patentability, PCT/US2014/067607, dated May 31, 2016, 10 pgs.

Tanium Inc., International Search Report and Written Opinion, PCT/US2015/020780, dated Jul. 2, 2015, 13 pgs.

Tanium Inc., International Preliminary Report on Patentability, PCT/US2015/020780, dated Sep. 27, 2016, 9 pgs.

Hindawi, Office Action, U.S. Appl. No. 15/702,617, dated Jun. 1, 2018, 37 pgs.

Hindawi, Final Office Action, U.S. Appl. No. 15/702,617, dated Dec. 27, 2018, 54 pgs.

Hunt, Office Action dated Oct. 4, 2018, U.S. Appl. No. 15/215,468, 13 pgs.

Hunt, Notice of Allowance dated Jan. 24, 2019, U.S. Appl. No. 15/215,468, 8 pgs.

Hunt, Notice of Allowance dated Apr. 1, 2019, U.S. Appl. No. 15/215,468, 8 pgs.

Hunt, Office Action dated Sep. 10, 2018, U.S. Appl. No. 15/215,474, 10 pgs.

Hunt, Final Office Action dated Apr. 1, 2019, U.S. Appl. No. 15/215,474, 7 pgs.

Hunt, Notice of Allowance, U.S. Appl. No. 15/713,518, dated Apr. 10, 2019, 14 pgs.

Lippincott, Notice of Allowance, U.S. Appl. No. 15/878,286, dated Apr. 25, 2019, 9 pgs.

Jae Woo Lee et al., 0 to 10k in 20 Seconds: Bootstrapping Large-Scale DHT Networks, 2011 IEE International Conference on Communications, Jun. 9, 2011, pp. 1-6.

Stoica, et al., Chord: A Scalable Peer-to-Peer Lookup Service for Internet Applications, 2001, pp. 1-12 (Year: 2002).

Ping Wang, Baber Aslann, Cliff C. Zou, Peer-to-Peer Botnets: The Next Generation of Botnet Attacks, Jan. 2010, pp. 1-25 (Year: 2010).

Sean Rhea, Dennis Geels, Timothy Roscoe, and John Kubiatowicz, Handling Churn in a DHT, 2004, pp. 1-14 (Year: 2004).

Richards, Non-Final Office Action, U.S. Appl. No. 16/443,720, dated Sep. 4, 2020, 11 pgs.

Richards, Notice of Allowance, U.S. Appl. No. 16/443,720, dated Feb. 9, 2021, 8 pgs.

Richards, Notice of Allowance, U.S. Appl. No. 16/443,720, dated Jun. 15, 2021, 7 pgs.

Goela, Non-Final Office Action, U.S. Appl. No. 16/943,291, dated Jul. 16, 2021, 15 pgs.

Freilich, Non-Final Office Action, U.S. Appl No. 17/129,638, dated Jul. 23, 2021, 6 pgs.

Richards, Notice of Allowance, U.S. Appl. No. 16/443,720, dated Aug. 4, 2021, 2 pgs.

Goela, Notice of Allowance, U.S. Appl. No. 16/943,291, dated Oct. 1, 2021, 8 pgs.

Hindawi, Non-Final Office Action, U.S. Appl. No. 16/917,800, dated Jul. 1, 2021, 6 pgs.

Hindawi, Notice of Allowance, U.S. Appl. No. 16/917,800, dated Oct. 25, 2021, 2 pgs.

Hindawi, Notice of Allowance, U.S. Appl. No. 16/917,800, dated Oct. 15, 2021, 7 pgs.

Goela, Notice of Allowance, U.S. Appl. No. 16/943,291, dated Oct. 18, 2021, 5 pgs.

Hoscheit, Non-Final Office Action, U.S. Appl. No. 17/001,586, dated Jun. 9, 2022, 6 pgs.

Freilich, Notice of Allowance, U.S. Appl. No. 17/129,638, dated Nov. 4, 2021, 8 pgs.

Hindawi, Notice of Allowance, U.S. Appl. No. 16/917,800, dated Nov. 18, 2021, 2 pgs.

Hindawi, Notice of Allowance, U.S. Appl. No. 16/917,800, dated Dec. 16, 2021, 2 pgs.

Stoddard, Non-Final Office Action, U.S. Appl. No. 16/870,742, dated Oct. 28, 2021, 5 pgs.

Stoddard, Notice of Allowance, U.S. Appl. No. 16/870,742, dated Mar. 7, 2022, 8pgs.

Goela, Notice of Allowance, U.S. Appl. No. 16/943,291, dated Oct. 1, 2021, 2 pgs.

Goela, Notice of Allowance, U.S. Appl. No. 16/943,291, dated Jan. 27, 2022, 2 pgs.

(56) References Cited

OTHER PUBLICATIONS

Goela, Notice of Allowance, U.S. Appl. No. 16/943,291, dated Feb. 25, 2022, 2 pgs.
Goela, Notice of Allowance, U.S. Appl. No. 16/943,291, dated Apr. 11, 2022, 2 pgs.
Lippincott, Notice of Allowance, U.S. Appl. No. 15/930,342, dated Mar. 24, 2022, 7 pgs.
Lippincott, Notice of Allowance, U.S. Appl. No. 15/878,286, dated Apr. 25, 2019, 5 pgs.
Lippincott, Notice of Allowance, U.S. Appl. No. 15/878,286, dated Jul. 31, 2019, 5 pgs.
Lippincott, Notice of Allowance, U.S. Appl. No. 15/136,790, dated Nov. 20, 2017, 9 pgs.
Lippincott, Notice of Allowance, U.S. Appl. No. 16/565,247, dated May 25, 2022, 8 pgs.
Hindawi, Notice of Allowance, U.S. Appl. No. 16/194,240, dated Mar. 31, 2020, 6 pages.
Ion Stoica, Robert Morris, David Karger, M. Frans Kaashoek and Hari Balakrishnan, Chord: A Scalable Peetopeer Lookup Service for Internet Applications, pp. 1-12 (Year:2001).
Guieu, Notice of Allowance, U.S. Appl. No. 16/854,844, dated Jul. 6, 2021, 15 pages.
Hindawi, Office Action, U.S. Appl. No. 13/797,946, dated Feb. 27, 2015, 17 pgs.
Hindawi, Notice of Allowance, U.S. Appl. No. 13/797,946, dated Sep. 11, 2015, 17pages.
Hindawi, Notice of Allowance, U.S. Appl. No. 15/004,757, dated Aug. 24, 2018, 4 pages.
Stoddard, Notice of Allowance, U.S. Appl. No. 16/532,391, dated Oct. 21, 2020, 8 pages.
Freilich, Notice of Allowance, U.S. Appl. No. 16/565,247, dated Oct. 15, 2020, 9 pages.

* cited by examiner

SYSTEM, SECURITY AND NETWORK MANAGEMENT USING SELF-ORGANIZING COMMUNICATION ORBITS IN DISTRIBUTED NETWORKS

PRIORITY CLAIM AND RELATED APPLICATIONS

This application is a continuation of U.S. application Ser. No. 16/854,844, filed Apr. 21, 2020, which claims priority to U.S. Provisional Application Ser. No. 62/873,796, filed Jul. 12, 2019, and is a continuation-in-part of U.S. application Ser. No. 16/194,240, filed Nov. 16, 2018, now U.S. Pat. No. 10,674,486, which is a continuation of U.S. application Ser. No. 15/004,757, filed Jan. 22, 2016, now U.S. Pat. No. 10,136,415, which is a continuation of U.S. application Ser. No. 13/797,946, filed Mar. 12, 2013, now U.S. Pat. No. 9,246,977, which claims under 35 U.S.C. 119(e) the benefit of U.S. Provisional Application Ser. No. 61/774,106, filed Mar. 7, 2013, and U.S. Provisional Application Ser. No. 61/745,236, filed Dec. 21, 2012, all of which are incorporated by reference herein in their entireties.

BACKGROUND

A managed network (e.g., an enterprise network) often includes a large number of machines and devices configured to perform a wide variety of functions. The amount of computing assets and the amount of data generated and used by these computing assets scale rapidly with the size of the network. System and resource management on a network, such as collecting real-time information regarding systems and resources in the network and dynamically modifying and reallocating resources and data in the network, requires a substantial amount of computation and communication resources.

In a centrally managed network, a central management server is responsible for issuing requests (e.g., requests for status updates, system management operations, and network management operations, etc.) to the targeted destination machines in the network. These requests often take a long time to propagate through the network to the appropriate destination machines. These latencies make real-time management of the machines in the network difficult. For example, it typically takes more time to collect information about the status of machines coupled to the network than it takes for each machine's status to change. Frequently, by the time the requested status information is received by an administrator, such information has already become outdated. In addition, in a centralized managed network, the central server can quickly become overwhelmed by the communication load and becomes a management bottleneck. Furthermore, a centralized management scheme is expensive to implement and maintain.

Some conventional systems attempt to ameliorate the problems of a centralized management scheme by performing some degree of aggregation or processing of data at intermediate control levels, resulting in a hierarchical management structure between the network administrator and the endpoint machines (sometimes called end nodes or endpoint nodes). These systems also do not scale well. For example, for a network with 100,000 machines, it may still take several hours or more to report the status of those individual machines, or even of an aggregate thereof. In that timeframe, many machines would likely have changed their status, making the status report obsolete. In addition, these hierarchical management structures themselves are difficult and complex to create and maintain, and are prone to problems and failures.

Other conventional systems amass information about network devices into one or more relatively large databases, so that network operators can query those databases for information about devices in the network. These systems also do not scale well. A relatively large network would produce enough data to swamp the operations of a database. One likely consequence is that only a small number of database queries can be made within resource limits of the database or its servers. Another problem with these systems is that their data tend, by the time answers are aggregated, not to reflect the true state of the devices in the network, and, because data is collected over time, the data no longer represent a consistent, snapshot view of those devices.

SUMMARY

In one aspect, a method of managing a non-static collection of systems or machines in a network includes establishing one or more linear communication orbits (LCOs) in the network to communicate system, security, and network management requests and data. Machines coupled to the network self-organize themselves into the linear communication orbit(s), where each linear communication orbit is a non-static collection of machines running a respective communication protocol. Minimal intervention or instructions from a central server or an administrator is required for a machine to switch from one linear communication orbit to another (e.g., for a machine to change communication protocols or otherwise leave one LCO and integrate into another LCO). Individual machines are responsible the formation and continued maintenance of the linear communication orbit(s) when machines join and/or exit the network.

More specifically, in some embodiments, a method of managing a non-static collection of machines comprises executing one or more applications at a first client machine in the non-static collection of machines, where the first client machine runs a first communication protocol, and the non-static collection of machines includes a first linear communication orbit, the first linear communication orbit comprising a sequence of machines that run the first communication protocol, and a second linear communication orbit, the second linear communication orbit comprising a sequence of machines that run a second communication protocol distinct from the first communication protocol. The method comprises, at the first client machine: receiving an instruction from a server to install the second communication protocol; installing the second communication protocol; subsequent to installing the second communication protocol, submitting a registration request to the server; obtaining, from the server, contact information of a list of potential neighbors of the first client machine, where each potential neighbor comprises a machine in the non-static collection of machines that runs the second communication protocol; and in response to obtaining the contact information, proactively constructing and maintaining a respective local segment of the second linear communication orbit, the respective local segment connecting the first client machine to a live succeeding machine and a live preceding machine in the list of potential neighbors.

In some embodiments, installing the second communication protocol includes removing the first communication protocol from the first client machine.

In some embodiments, proactively constructing and maintaining a respective local segment of the second linear communication orbit further comprises: proactively establishing, in accordance with the second communication protocol, a respective propagation channel from the first client machine to the live succeeding machine upon detecting that said respective propagation channel to the live succeeding machine does not already exist; and proactively establishing, in accordance with the second communication protocol, a respective reporting channel from the first client machine to the live preceding machine upon detecting that said respective reporting channel to the live preceding machine does not already exist.

In some embodiments, the server maintains two or more lists of potential neighbors, where each potential neighbor in a respective list runs a same respective communication protocol (e.g., the potential neighbors in a first list all run the first communication protocol, and the potential neighbors in the second list all run the second communication protocol).

In some embodiments, installing the second communication protocol at the first client machine includes the first client machine decoupling from the first linear communication orbit.

In some embodiments, the first linear communication orbit includes one or more machines directly connected to a respective server, and the second linear communication orbit includes one or more machines directly connected to the same respective server.

In some embodiments (e.g., where, after constructing the local segment of the second linear communication orbit, the first client machine is the head machine in the second linear communication orbit), the live preceding machine of the first client machine is the server. In some embodiments (e.g., where, after constructing the local segment of the second linear communication orbit, the first client machine is the tail machine in the second linear communication orbit), the live succeeding machine of the first client machine is the server.

In some embodiments, the respective local segment includes the first client machine and four distinct communication channels each originating from or terminating at the first client machine, including respective receiving and reporting communication channels between the first client machine and the live preceding machine, and respective collection and propagation communication channels between the first client machine and the live succeeding machine.

Various embodiments may provide one or more of the following advantages:

In some embodiments, status information can be collected in substantially real-time. Assuming a network of 100,000 machines, an inquiry response time to a server from all the machines within an LCO can be in the order of seconds (e.g., 15 seconds) rather than hours or days, as in the case of conventional network management schemes.

In some embodiments, only a single server is used in the entire network (e.g., to coordinate communication with and between one or more LCOs), and system management infrastructure cost can be greatly reduced as compared to conventional management schemes.

Conventional technologies require massive amounts of data to flow over a wide area network, which is typically a bottleneck, and is typically slow and expensive, and not always available. In some embodiments of the present invention, most of the management communications can be accomplished with local area networks, which are fast, cheap, and always available.

In some embodiments, only a small number of connections need to be maintained. For example, in a network of 100,000 machines, according to conventional management techniques, a single management query may involve opening at least 200,000 connections—100,000 for the query to be sent from the server to every machine, and 100,000 for the answers back to the server. In contrast, in some embodiments of the present invention, only about two hundred connections may be needed, e.g., one hundred connections for the query to be sent from the server to the head machines on one hundred contiguous linear communication orbits, and one hundred connections for the answers back from the tail machines on the contiguous linear communication orbits.

Other embodiments and advantages are apparent to those skilled in the art in light of the descriptions and drawings in this specification.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining," or "in accordance with a determination that . . . ," or "in response to determining," or "upon detecting [the stated condition or event]," or "in response to detecting [the stated condition or event]," depending on the context.

Figure 1A:
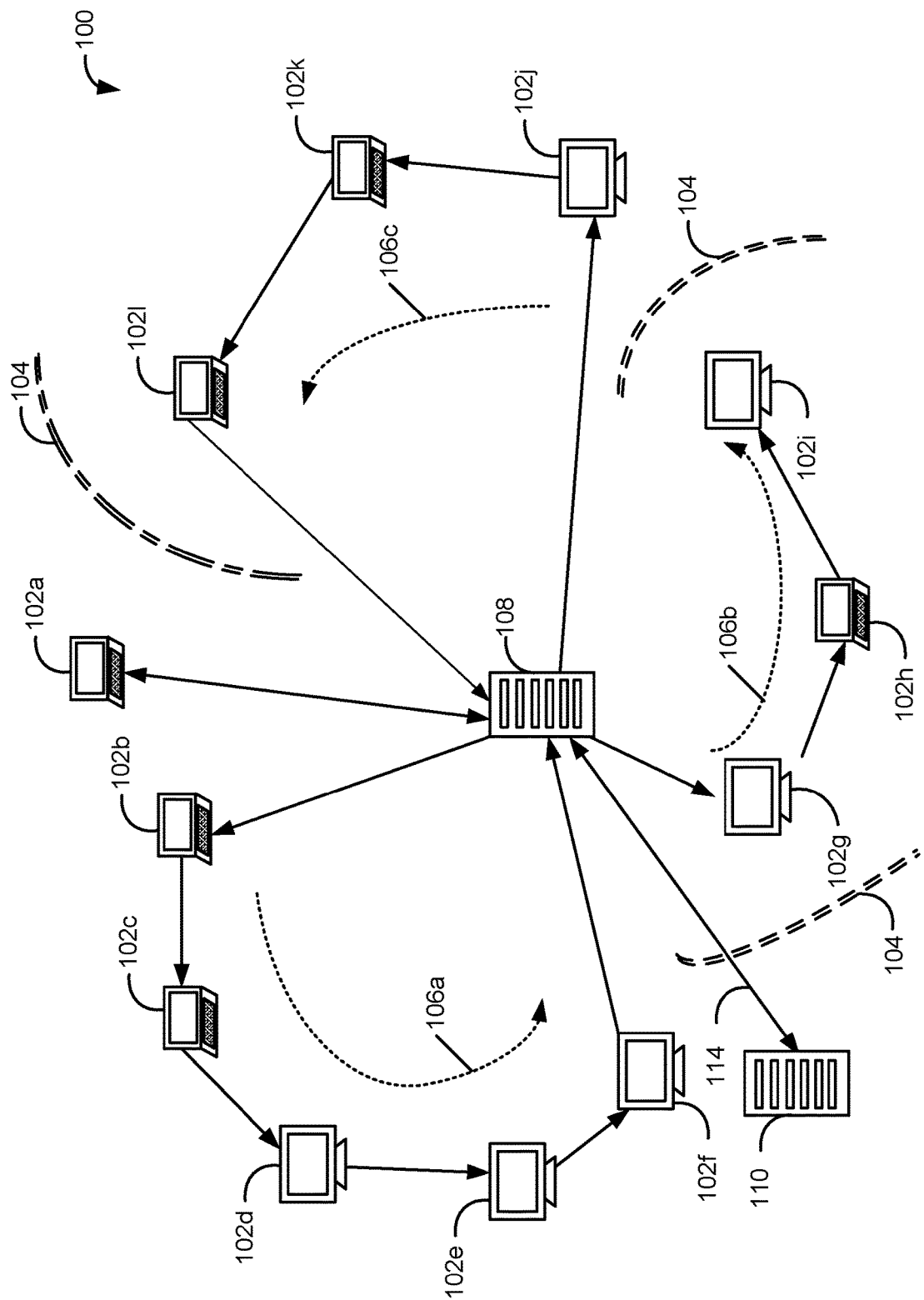
FIGS. 1A and 1B collectively illustrate computer network organized into linear communication topologies, in accordance with some embodiments.

FIG. 1A illustrates a managed network 100 comprising a plurality of interconnected machines 102 (including machines 102a-1), e.g., computers, servers, mobile devices, special purpose devices (e.g., sales kiosks, automated teller machines (ATMs), etc.), and other networked devices. Examples of managed network 100 include an enterprise network or another network under common management. In some embodiments, at least some of machines 102 coupled to managed network 100 are distributed across different geographical areas and/or localized at the same physical location. In some embodiments, machines 102 coupled to managed network 100 are divided into several sub-networks separated by one or more firewalls 104. In some embodiments, machines 102 currently coupled to network 100 are self-organized into one or more contiguous segments 106 of a single linear communication orbit. In some embodiments, each contiguous segment 106 is viewed as a respective linear communication orbit. In some embodiments, each linear communication orbit is used to support system, security, and network management communications within managed network 100.

In some embodiments, each linear communication orbit includes one or more machines running a respective communication protocol. In some embodiments, managed network 100 also includes server 108 that facilitates the creation and maintenance of the one or more contiguous segments 106. In some embodiments, each contiguous segment 106 includes one head machine (e.g., head machine 102b), one tail machine (e.g., tail machine 102f), and a sequence of zero or more intermediate client machines (e.g., intermediate machine(s) 102c-e) in between the head machine and the tail machine. In some embodiments, the head machine and tail machine of each contiguous segment 106 are connected to server 108, as shown in FIG. 1A. In some embodiments, only the head machine of each contiguous segment 106 is connected to the server, while the intermediate machines and tail machines are not connected to the server. In some embodiments, when a machine is not part of any contiguous segment 106, that machine remains as a singleton (e.g., singleton 102a) connected to server 108.

Figure 1B:
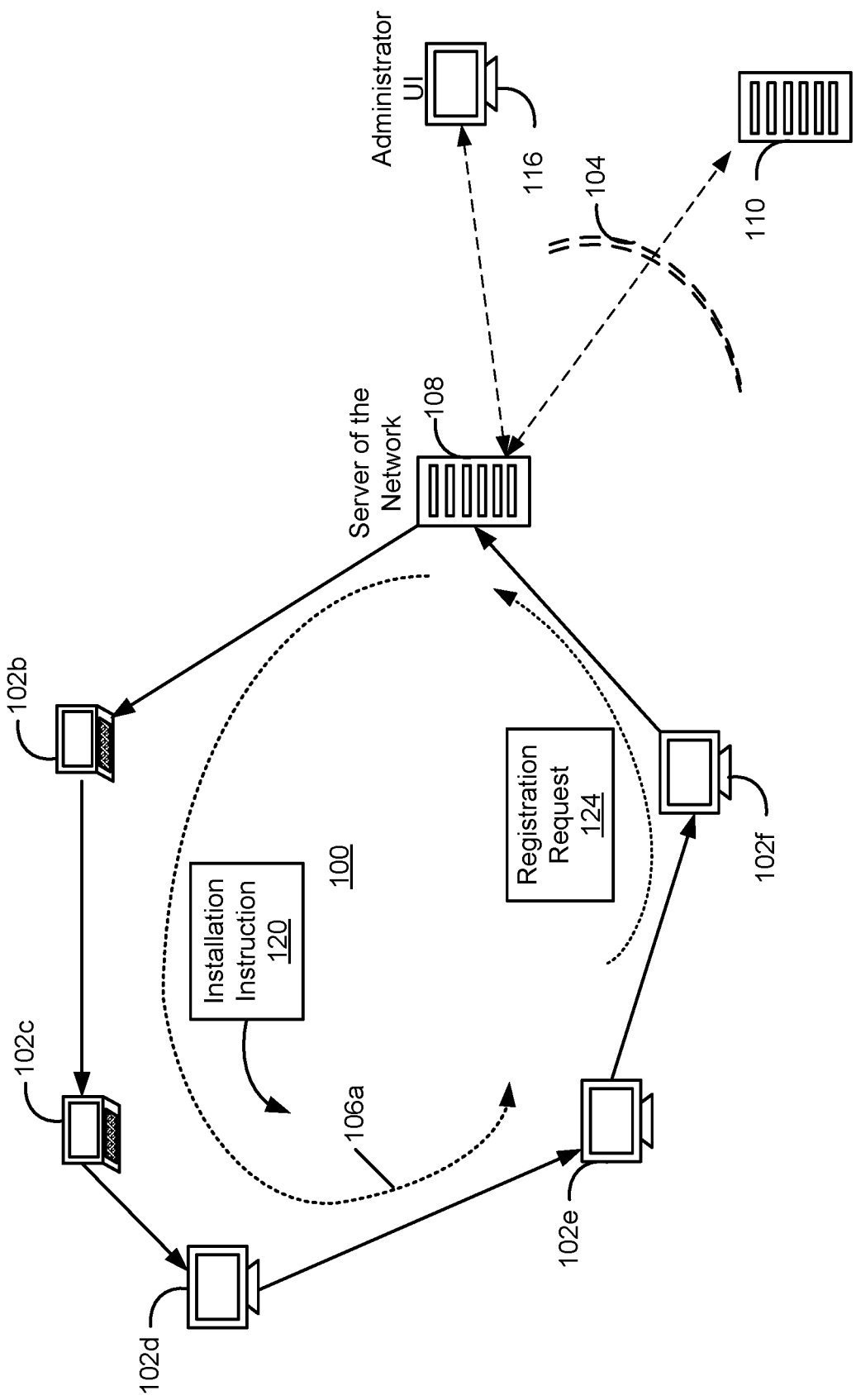

In some embodiments, the methods described herein, or portions of those methods, are performed at a remote server (e.g., remote server 110) that is not part of managed network 100 and is optionally separated from managed network 100 by a firewall 104, see FIGS. 1A and 1B). In some embodiments, the methods described herein, or portions of those methods, are performed at an administrator machine (e.g., administrator machine 116 that interacts with one or more nodes 102 through server 108 of the network and/or remote server 110, see FIG. 1B).

In some embodiments, each machine 102 within managed network 100 is optionally configured to communicate with another machine within or outside of managed network 100 through various connection-oriented and/or connectionless protocols during their normal operations (e.g., user-level operations, such as emailing, Internet browsing, VoIP, database accessing, etc.) The present specification focuses on communication orbits that are established and maintained to facilitate system, security and/or network management operations ascribed to manual and programmed administrations of network 100. Examples of system, security and network management operations include: (1) collection of status information (e.g., bandwidth, load, availability, resource inventory, application status, machine type, date of last update, security breach, errors, etc.) from individual machines of the managed network; (2) issuance of system, security and network management commands (e.g., commands related to shut down, restart, failover, release of resources, change access authorizations, backup, deployment, quarantine, load balancing, etc.) for individual resources and/or machines on the managed network; (3) remotely controlled software installations and updates (e.g., enterprise software installations and updates, patch installations, anti-virus updates, database updates, file sharing, etc.); (4) detecting presence of particular malicious programs, code, script (e.g., virus, malware, security holes, etc.) on individual machines on the managed network; (5) removal of or disabling particular malicious programs, code, script (e.g., virus, malware, security holes, etc.) on individual machines on the managed network; (6) disabling or suspending suspicious or high-risk operations and activities (e.g., Internet or operating system activities of suspected virus programs, malware, etc.) on particular machines on the managed network; (7) detecting unmanaged machines connected to the managed network; (8) detecting data leakage (e.g., transmission of confidential information) from machines on the managed network to locations or machines outside of the managed network; (9) detecting connection or data transfer to/from removable data storage devices (e.g., memory stick, or other removable storage devices) from/to particular ports (e.g., a USB drive) of particular machines on the managed network. Other system, security and network management operations are possible and are apparent to those of ordinary skills in the art.

In some embodiments, as shown in FIGS. 1A and 1B, each linear communication orbit linking all of the machines coupled to network 100 is a bidirectional communication orbit including a respective unidirectional communication channel between each pair of adjacent machines in an ordered sequence of all machines 102 in network 100. In some embodiments, one or more linear communication orbits are bidirectional communication orbits including a respective pair of communication channels (one for each direction) between each pair of adjacent machines in an ordered sequence of all machines 102 in network 100. In some embodiments, a unidirectional communication orbit is used for propagating status inquiries and management commands (e.g., for the transmission of Installation Instructions 120 and/or Registration Requests 124) between machines 102 in network 100. In some embodiments, a bidirectional communication orbit is used for software and file distribution to machines 102 in network 100.

In some embodiments, a single dedicated server (e.g., server 108) is provided in the entire network (e.g., network 100). In some embodiments, server 108 is elected automatically from among all or a subset of machines 102 according to various predetermined election rules implemented on machines 102. In some embodiments, no server is needed to facilitate the formation and maintenance of the linear communication orbit(s) in network 100, as long as machines 102 have other ways of obtaining their respective ordinal positions (or a respective list of their potential neighbors) in the sequence of all machines currently coupled to network 100. For example, in some embodiments, each machine may store a static list of its potential neighbors rather than relying on a server to provide such a list, provided that only a substantially fixed set of machines can be coupled to the network. In other embodiments, a server (e.g., server 108 or 110) stores one or more lists of potential neighbors, where each list comprises machines that run a respective communication protocol. In such embodiments, the server periodically updates the one or more lists of potential neighbors (e.g., when one or more machines switches from one communication protocol to another, and/or when one or more machines is added to network 100 or removed from network 100).

As set forth in the background, some conventional techniques for system, security and network management rely on a hierarchical system management infrastructure. The hierarchical system management infrastructure includes one or more intermediate servers for funneling management inquiries and requests toward subsidiary intermediate servers and leaf machines of the hierarchical infrastructure. The one or more intermediate servers also aggregate responses and reports from subsidiary intermediate servers and the leaf machines. The hierarchical system management structure is rigid and difficult to modify in real-time. Failure of an intermediate server can cause large scale unavailability of many machines even if those machines do not suffer from any defects themselves. In addition, the hierarchical system management infrastructure has many potential bottlenecks at the intermediate servers, making management communications up and down the hierarchy inefficient, time consuming, and often untimely. Furthermore, the hierarchical system management infrastructure is costly to setup and to maintain both in terms of equipment and personnel.

In contrast, communication orbit(s) 106 shown in FIGS. 1A and 1B do not require a hierarchical management structure. Even though a single server (e.g., server 108) is employed in some embodiments, most of the management duties and communications are provided on a substantially flat (as opposed to hierarchical) structure made up of all the machines (e.g., machines 102) coupled to the network (e.g., network 100). Consequently, network management imposes minimal workload on the capabilities of the server.

In addition, as discussed in more detail later, each machine in the communication orbit(s) 106 shown in FIGS. 1A and 1B is only communicating directly with a small number of other machines (e.g., its immediate predecessor and succeeding machines in a local segment of the linear communication orbit) for purposes of network management. Machines 102 in each local segment can quickly reestablish the continuity of the linear communication orbit when a particular machine in the communication orbit fails or exits network 100. The linear communication orbits shown in FIGS. 1A and 1B also provide quick and easy insertions of new machines into network 100 because the insertion only affects a local segment of the linear communication orbit involving a small number of machines 102 already present in the orbit. As a result, the system management structure shown in FIGS. 1A and 1B can quickly scale up and down with minimal equipment and personnel cost devoted to the changes made to the system management infrastructure itself.

In some embodiments, system, security and network management communications are propagated along the linear communication orbit(s) in one or both directions to collect system and network information, invoke system, security and network management actions, and/or push out system and network updates. In some embodiments, each machine 102 receiving a communication message from its upstream neighbor machine (or downstream neighbor machine) acts upon the message by providing an update to the message based on its local state or information, performing some aggregation of the information in the message, and/or forwarding the message to its downstream neighbor machine (or upstream neighbor machine) along the linear communication orbit. Essentially, each machine expends a small amount of resources to take on a small part of the duties of an intermediate management server without being overly burdened. More details on how the system, security and network management messages are propagated to and collected from machines 102 in network 100 through linear communication orbit(s) 106 are provided in the Applicants' prior application, U.S. patent application Ser. No. 12/412,623, filed Mar. 27, 2009, now U.S. Pat. No. 8,086,729, entitled "Distributed Statistical Detection of Network Problems and Causes," which is hereby incorporated by reference in its entirety.

An important feature of the linear communication orbit(s) 106 is that they are automatically formed without global, continuous, and/or active intervention by any network administrative program or personnel. Each machine 102 joining network 100 is equipped with (or provided with) a set of predetermined organization rules. According to the set of predetermined organization rules, each machine 102 finds its neighboring machines and coordinates with these neighboring machines to self-organize into a local segment of the linear communication orbit. The local segments of adjacent machines overlap and fuse into a contiguous segment of the linear communication orbit.

In some embodiments, each machine 102 obtains the set of predetermined organization rules from server 108 as the machine first joins network 100. In some embodiments, each machine 102 queries server 108 to obtain pertinent information (e.g., a list of potential neighbors) that helps the machine to determine its ordinal position in the linear communication orbit. Each machine 102 then proactively contacts its potential predecessor and succeeding machines to identify its upstream and downstream neighbor machines and to establish a local segment of the linear communication orbit centered about said machine 102.

In some embodiments, the linear communication orbit organically grows or contracts as machines join and leave network 100, without global, continuous, and/or active intervention by any network administrative programs or personnel. Although all machines 102 implement the same set of predetermined organization rules and each machine only directly interacts with its immediate neighborhood machines, the predetermined organization rules are designed in a way that causes global coordination of the machines' independent local actions. The global coordination results in self-organization and automatic repair and maintenance of the linear communication orbit(s) 106.

Figure 2:
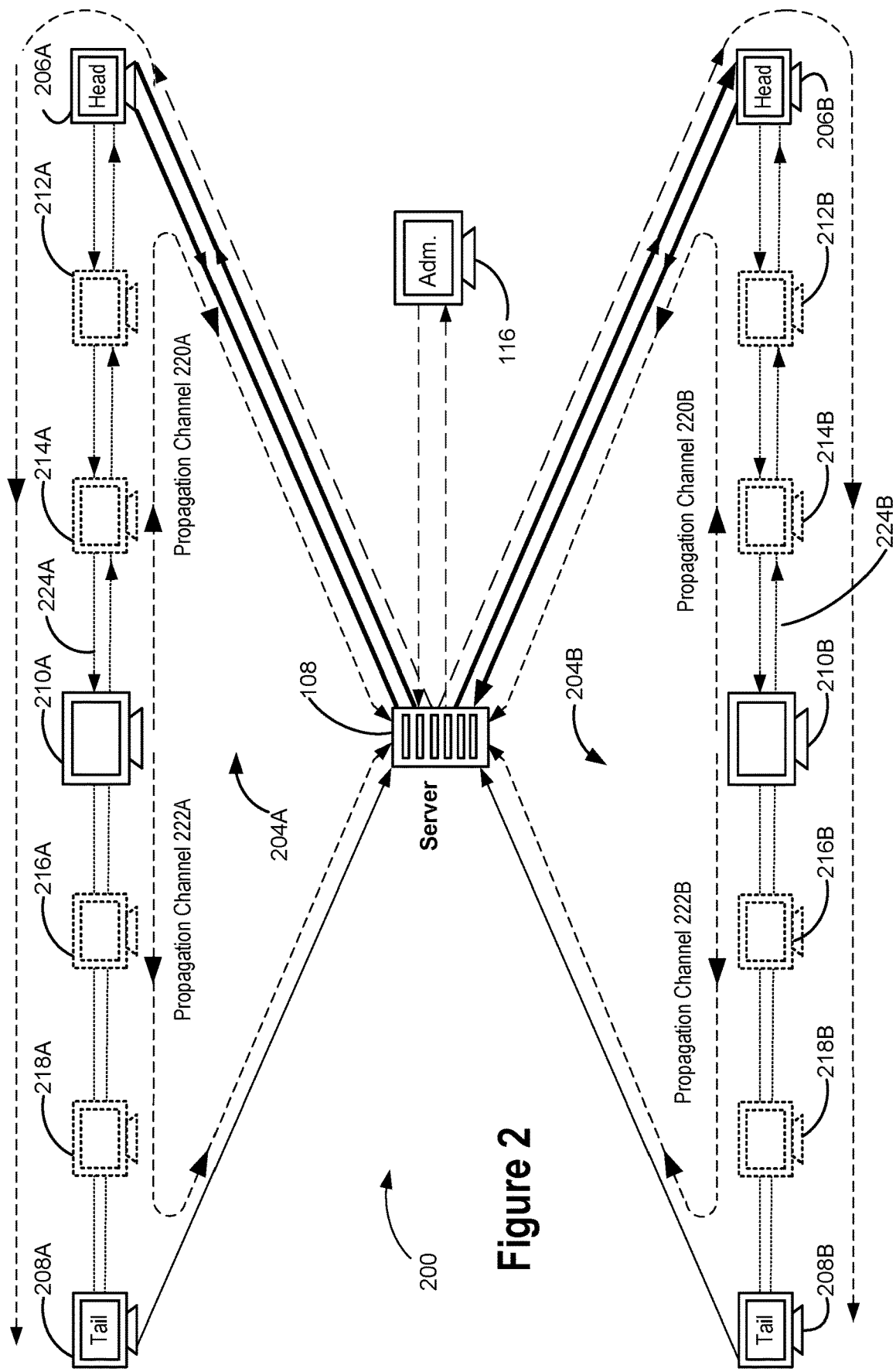
FIG. 2 illustrates an example of two or more linear communication orbits coupled to a single server system, in accordance with some embodiments.

FIG. 2 illustrates an example of two or more linear communication orbits 204 (e.g., orbits 204A and 204B) coupled to a server system 108 in accordance with some embodiments. Each linear communication orbit 204 includes a respective sequence of machines. Each of the machines has a respective unique identifier. Each machine in a respective linear communication orbit runs the same respective communication protocol. The sequence of machines in each linear communication orbit has self-organized into an ordered sequence, in accordance with a predefined order of the unique identifiers of each machine in each sequence of machines. In some embodiments, a single server system 108 is coupled to both linear communication orbits 204. For example, server system 108 is coupled to first linear communication orbit 204A at a first head node 206A, and first linear communication orbit 204A further includes a first tail node 208A and a first plurality of intermediate machines (e.g., machines 210A-218A), which are coupled between first head node 206A and first tail node 208A. Likewise, server system 108 is coupled to second linear communication orbit 204B at a second head node 206B, and second linear communication orbit 204B further includes a second tail node 208B and a second plurality of intermediate machines (e.g., machines 210B-218B), which are coupled between second head node 206B and second tail node 208B.

Each linear communication orbit, 204, includes at least one propagation channel 220 traveling downstream from tail machine 208, through each and every intermediate machine in the respective linear communication orbit (e.g., 210-218) to server 108 (e.g., through head machine 206). Each linear communication orbit 204 also includes at least one propagation channel 222 traveling upstream from head machine (e.g., 206), through each and every intermediate machine in the respective linear communication orbit (e.g., 210-218) to server 108 (e.g., through tail machine 208). These propagation channels serve to transmit messages, instructions, data requests, etc. through each linear communication orbit.

As shown in FIG. 2, each pair of adjacent machines in the linear communication orbit also has a pair of communication channels established between them (e.g., 224A between machines 210A and 214A). This pair of communication channels provides full-duplex communications between the pair of adjacent machines. Each machine has the ability to simultaneously receive information from and provide information to its adjacent machines upstream and downstream in the linear communication orbit. In some embodiments, the communication channels are established using a connection-oriented communication protocol, such as TCP, SMTP, DCCP, connection-oriented Ethernet, ATM, IPS, SCTP, or any other suitable connection-oriented communication protocol. Although it is possible to use less reliable, connectionless protocols, such as UDP, to support communications between adjacent machines in the linear communication orbit, maintaining a stable communication channel based on a connection-oriented communication protocol is advantageous in some embodiments because such protocols are more reliable and require less error correction and processing time. In some embodiments, a connectionless protocol may be advantageous because it is more lightweight as compared to a connection-oriented protocol. In various embodiments, the communication channels may be supported by both wired and wireless communication protocols and communication means. In addition, each machine only needs to maintain a small number of open connections (e.g., at most four open connections) at any given time. In most cases, this is not burdensome to the machines and eliminates latencies that could be introduced by reestablishing the connections for individual communications.

While intermediate machines 210A-218A and 210B-218B illustrate the configuration of linear communication orbits 204A and 204B, respectively, in some embodiments, linear communication orbit 204A or 204B includes only one intermediate machine, while in other embodiments, it includes dozens, hundreds, or even thousands of intermediate machines.

Figure 3:
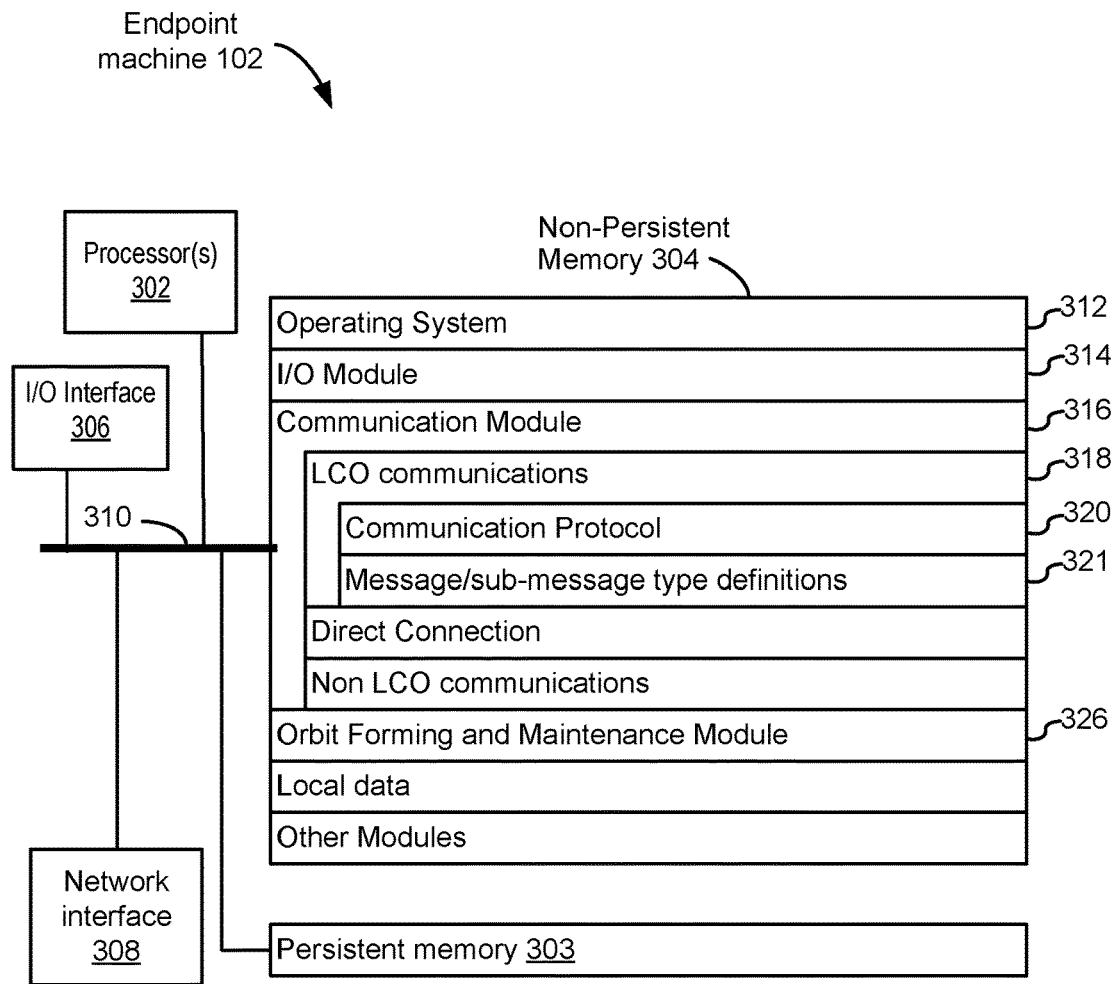
FIG. 3 is a block diagram of an exemplary client machine in a managed network in accordance with some embodiments.

FIG. 3 is a block diagram of an exemplary machine 102, sometimes called an endpoint machine or client machine, shown in FIGS. 1A and 1B (also machines 206-218 in FIG. 2). In some embodiments, endpoint machine 102 includes one or more processors 302, memory (e.g., persistent memory 303 and non-persistent memory 304) for storing programs and instructions for execution by one or more processors 302, one or more communications interfaces such as input/output interface 306 and network interface 308, and one or more communications buses 310 for interconnecting these components.

In some embodiments, input/output interface 306 includes a display and input devices such as a keyboard, a mouse, or a track-pad. However, in some embodiments, endpoint machine 102 does not include an input/output interface 306. In some embodiments, communication buses 310 include circuitry (sometimes called a chipset) that interconnects and controls communications between system components. In some embodiments, non-persistent memory 304 includes high-speed random access memory, such as DRAM, SRAM, DDR RAM or other random access solid state memory devices. In some embodiments, persistent memory 303 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. In some embodiments, persistent memory 303 optionally includes one or more storage devices remotely located from the one or more processors 302. In some embodiments, persistent memory 303 and/or the non-volatile memory device(s) within the non-persistent memory 304, comprises non-transitory computer readable storage medium.

In some embodiments, memory 304 or alternatively the non-transitory computer readable storage medium stores the following programs, modules and data structures, instructions, or a subset thereof:

Operating System 312 that includes procedures for handling various basic system services and for performing hardware dependent tasks.

Optionally, I/O module 314 that includes procedures for handling various basic input and output functions through one or more input and output devices.

Communication module 316, which comprises:

LCO communications module 318 that includes instructions for (1) connecting machine 102 to other machines (e.g., other machines 102 in network 100) in the same linear communication orbit 106 (FIGS. 1A, 1B) or 204 (FIG. 2) as machine 102, (2) handling receipt, processing, propagation, collection and reporting of system, security and network management messages and commands, and/or distribution of files and software updates via the linear communication orbit, and (3) the communication protocol 320 currently installed on endpoint machine 102, for communications with server 108 and machine 102's neighbors in the linear communication orbit. In some embodiments, the LCO communication module 318 also includes a library of message or message type definitions 321, which define the types of messages and sub-messages that the machine 102 is configured to handle using the communication protocol 320; as discussed in more detail below.

Direct connection module 322 that includes instructions to establish a direct full duplex connection with an external machine, such as server 110, in response to an instruction packet received by machine 102 via the linear communication orbit.

Non-LCO communications module 324 that includes instructions for connecting machine 102 to servers (e.g., server 108) via one or more network communication interfaces 308 (wired or wireless) and one or more communication networks, such as the Internet, other wide area networks, local area networks, metropolitan area networks, and so on.

Orbit formation and maintenance module 326 that includes instructions to self-insert machine 102 into a linear communication orbit, self-heal from a broken link in the linear communication orbit, and maintain the linear communication orbit for network and system management.

Local data 328 such as messages, files, reports and/or other information (e.g., neighboring machine information that includes information identifying neighboring machines of machine 102) that is stored locally (e.g., in a local database of machine 102), temporarily or otherwise; in some embodiments or circumstances, portions of local data 328 is stored upon receipt from a preceding machine, succeeding machine, server, or external machine; in some embodiments or circumstances, portions of local data 328 is locally generated, revised or supplemented by machine 102; and in some embodiments or circumstances, portions of local data 328 is transmitted by machine to a preceding machine, succeeding machine, server, or external machine.

Optionally, other modules 330 that include instructions for handling other functions and aspects described herein, such as creation and maintenance of local event logs. performing IOC (indicators of compromise) evaluations based on local state, etc.

FIG. 3 is merely illustrative of the structures of machines 102. A person skilled in the art would recognize that particular embodiments of machines 102 may include more or fewer components than those shown. One or more modules may be divided into sub-modules, and/or one or more functions may be provided by different modules than those shown.

Figure 4:
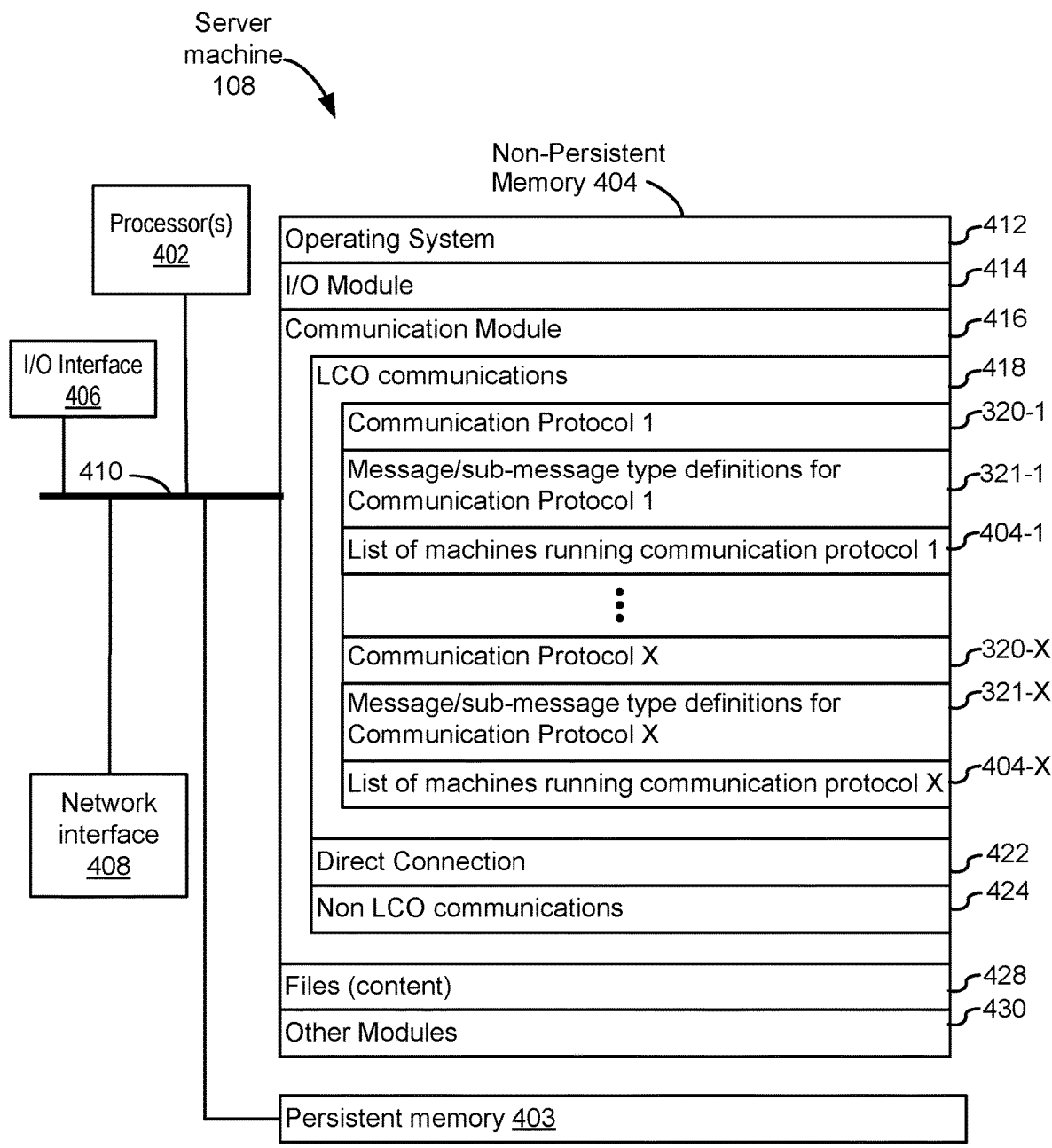
FIG. 4 is a block diagram of an exemplary server in a managed network in accordance with some embodiments.

FIG. 4 is a block diagram of an exemplary computer system 108, sometimes called server 108, or server system 108 (e.g., server 108 of the networks shown in FIGS. 1A, 1B, and 2). In some embodiments, server 108 includes one or more processors 402, memory (e.g., persistent memory 403 and non-persistent memory 404) for storing programs and instructions for execution by one or more processors 402, one or more communications interfaces such as input/output interface 406 and network interface 408, and one or more communications buses 410 for interconnecting these components. In some embodiments, the one or more communication interfaces couple server 108 to, and enable communications with machines in a non-static collection of machines (e.g., machines 102, FIGS. 1A and 1B, or machines 206-218, FIG. 2). More specifically, in some embodiments, the one or more communication interfaces, such as network interface 408, couple server 108 to a plurality of linear communication orbits (e.g., LCOs 106, FIGS. 1A and 1B, or LCOs 204, FIG. 2), including a first linear communication orbit and a second linear communication orbit; the first linear communication orbit comprising a sequence of machines, in the non-static collection of machines, that run a first communication protocol; the second linear communication orbit comprising a sequence of machines, in the non-static collection of machines, that run a second communication protocol distinct from the first communication protocol.

In some embodiments, input/output interface 406 includes a display and input devices such as a keyboard, a mouse, or a track-pad. However, in some embodiments, server system 108 does not include an input/output interface 406. In some embodiments, communication buses 410 include circuitry (sometimes called a chipset) that interconnects and controls communications between system components. In some embodiments, non-persistent memory 404 includes high-speed random access memory, such as DRAM, SRAM, DDR RAM or other random access solid state memory devices. In some embodiments, persistent memory 403 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. In some embodiments, persistent memory 403 optionally includes one or more storage devices remotely located from the one or more processors 402. In some embodiments, persistent memory 403 and/or the non-volatile memory device(s) within the non-persistent memory 404, comprises non-transitory computer readable storage medium.

In some embodiments, memory 404 or alternatively the non-transitory computer readable storage medium stores the following programs, modules, data structures, instructions, or a subset thereof:

Operating System 412 that includes procedures for handling various basic system services and for performing hardware dependent tasks.

Optionally, I/O module 414 that includes procedures for handling various basic input and output functions through one or more input and output devices.

Communication module 416, which comprises:

LCO communications module 418 that includes instructions for (1) connecting server 108 to other machines (e.g., other machines 102 in network 100) in one or more linear communication orbits 106 (FIGS. 1A, 1B) or 204 (FIG. 2) connected to and serviced by server 108, (2) handling receipt, processing, propagation, collection and reporting of system, security and network management messages and commands via the one or more linear communication orbits connected to and serviced by server 108, and/or distribution of files and software updates, and (3) a set of communication protocols 320 (e.g., 320-1 to 320-X) used by server 108 to communication with machines on the linear communication orbits connected to and serviced by server 108, where X, representing the number of distinct communication protocols used by server 108, is an integer greater than 1 (e.g., X, in some embodiments is equal to 2, while in some other embodiments is equal to 3 or 4). In some embodiments, LCO communications module 418 maintains (and locally stores) lists of machines 404 (e.g., 404-1 to 404-X) that are configured to communication over a linear communication orbit using a corresponding communication protocol 320, and provides a portion of one of those lists 404 to a respective endpoint machine 102 when the respective endpoint machine 102 requests a list of potential neighbors using the same communication protocol as the respective endpoint machine. In some embodiments, the LCO communication module 418 also includes, for each communication protocol, 1 to X, a library of message or message type definitions 321-1 . . . 321-X, which define the types of messages and sub-messages that the server 108 is configured to handle using those communication protocols 320-1 to 320-X; as discussed in more detail below.

Direct connection module 422 that includes instructions for sending an instruction packet to a specified machine 102 on a linear communication orbit, instructing that machine 102 to initiate an outbound connection to an external machine (e.g., server 108 or server 110), establishing a direct full duplex connection between the specified machine 102 and the external machine, which can then be used by the external machine to inspect and update machine 102.

Non-LCO communications module 424 that includes instructions for connecting server 108 to other machines, such as other servers 108 or 110, administrator machine(s) 116, etc., via one or more network communication interfaces 408 (wired or wireless) and one or more communication networks, such as the Internet, other wide area networks, local area networks, metropolitan area networks, and so on.

Files (content) 428 such as files, reports and/or other information (e.g., for storing result data that has been transmitted from machines in one or more linear communication orbits) that is stored, temporarily or otherwise, upon receipt from other machines, and/or that is locally generated, revised, or supplemented by server 108.

Optionally, other modules 430, including function modules, that include instructions for handling other functions and aspects described herein, such as the aggregation of information received from endpoint machines, evaluation of such information, generating reports or notifications (e.g., to an administrator machine 116) based on such information, etc.

FIG. 4 is merely illustrative of the structures of server 108 or 110. A person skilled in the art would recognize that particular embodiments of server 108, for example, may include more or fewer components than those shown. One or more modules may be divided into sub-modules, and/or one or more functions may be provided by different modules than those shown.

Figure 5:
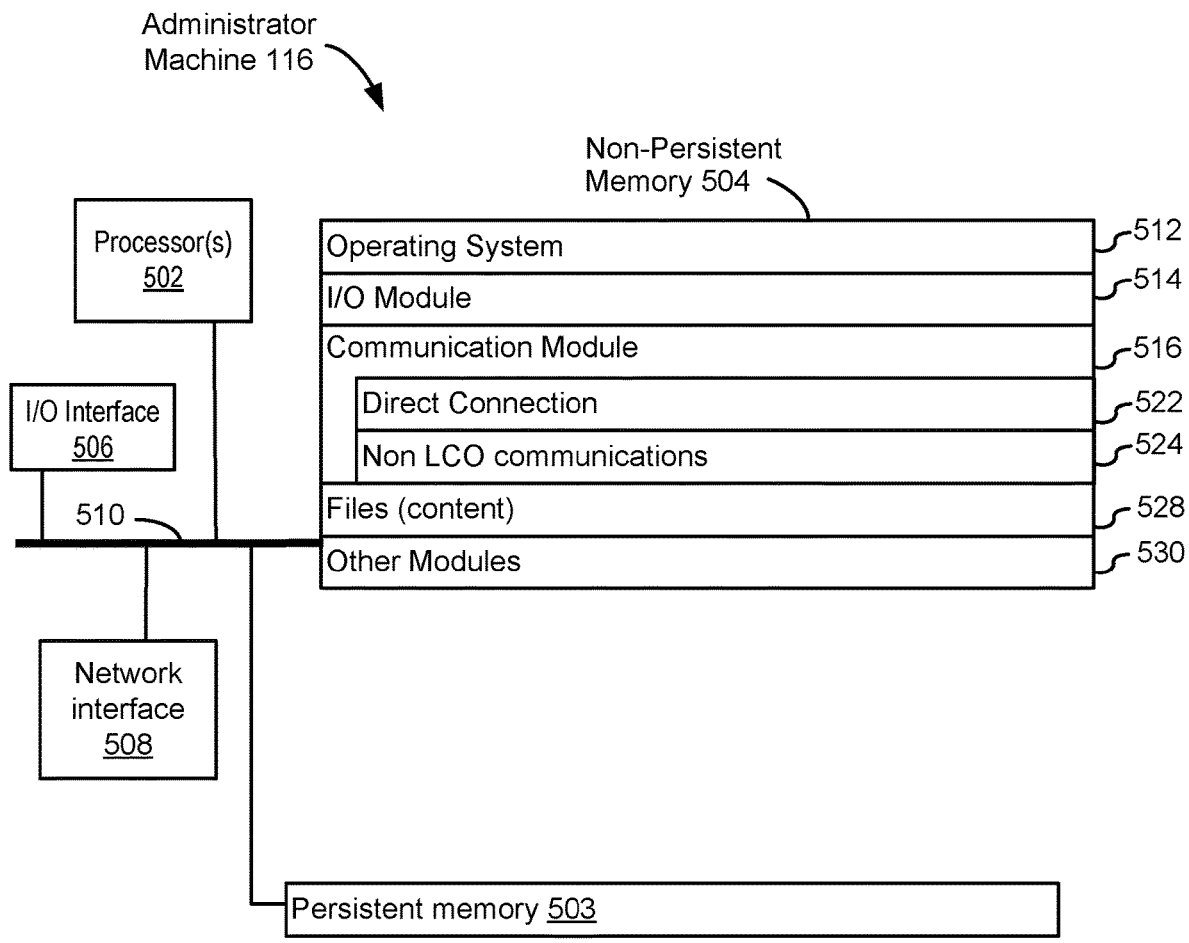
FIG. 5 is a block diagram of an exemplary administrator machine in a managed network in accordance with some embodiments.

FIG. 5 is a block diagram of an exemplary computer system 116, such as an administrator machine of the network shown in FIG. 2. In some embodiments, administrator machine 116 includes one or more processors 502, memory (e.g., persistent memory 503 and non-persistent memory 504) for storing programs and instructions for execution by one or more processors 502, one or more communications interfaces such as input/output interface 506 and network interface 508, and one or more communications buses 510 for interconnecting these components.

In some embodiments, input/output interface 506 includes a display and input devices such as a keyboard, a mouse, or a track-pad. In some embodiments, communication buses 510 include circuitry (sometimes called a chipset) that interconnects and controls communications between system components. In some embodiments, non-persistent memory 504 includes high-speed random access memory, such as DRAM, SRAM, DDR RAM or other random access solid state memory devices. In some embodiments, persistent memory 503 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. In some embodiments, persistent memory 503 optionally includes one or more storage devices remotely located from the one or more processors 502. In some embodiments, persistent memory 503 and/or the non-volatile memory device(s) within the non-persistent memory 504, comprises a non-transitory computer readable storage medium.

In some embodiments, memory 504 or alternatively the non-transitory computer readable storage medium of memory 504, stores the following programs, modules, data structures, instructions, or a subset thereof:

Operating System 512 that includes procedures for handling various basic system services and for performing hardware dependent tasks.

I/O module 514 that includes procedures for handling various basic input and output functions through one or more input and output devices.

Communication module 516, which includes:

Direct connection module 522 that includes instructions for sending an instruction packet, via a server 108, to an endpoint machine 108, instructing the endpoint machine to initiate an outbound connection to administrator machine 116 (or another external machine such as server 110), establishing a direct full duplex connection with administrator machine 116 or other external machine.

Non-LCO communications module 524 that includes instructions for handling communications between administrator machine 116 and other machines, such as server 108, via one or more network communication interfaces 508 (wired or wireless) and one or more communication networks, such as the Internet, other wide area networks, local area networks, metropolitan area networks, and so on.

Files (content) 528 such as files, reports and/or other information (e.g., for storing result data that has been transmitted from machines in one or more linear communication orbits) that is stored, temporarily or otherwise, upon receipt from other machines, and/or that is locally generated, revised, or supplemented by administrator machine 116.

Optionally, other modules 530, including function modules, that include instructions for handling other functions and aspects described herein, such as the aggregation of information received from endpoint machines, evaluation of such information, generating reports or notifications (e.g., to other machines) based on such information, etc.

FIG. 5 is merely illustrative of the structures of administrator machine 116. A person skilled in the art would recognize that particular embodiments of administrator machine 116, for example, may include more or fewer components than those shown. One or more modules may be divided into sub-modules, and/or one or more functions may be provided by different modules than those shown.

Figure 6:
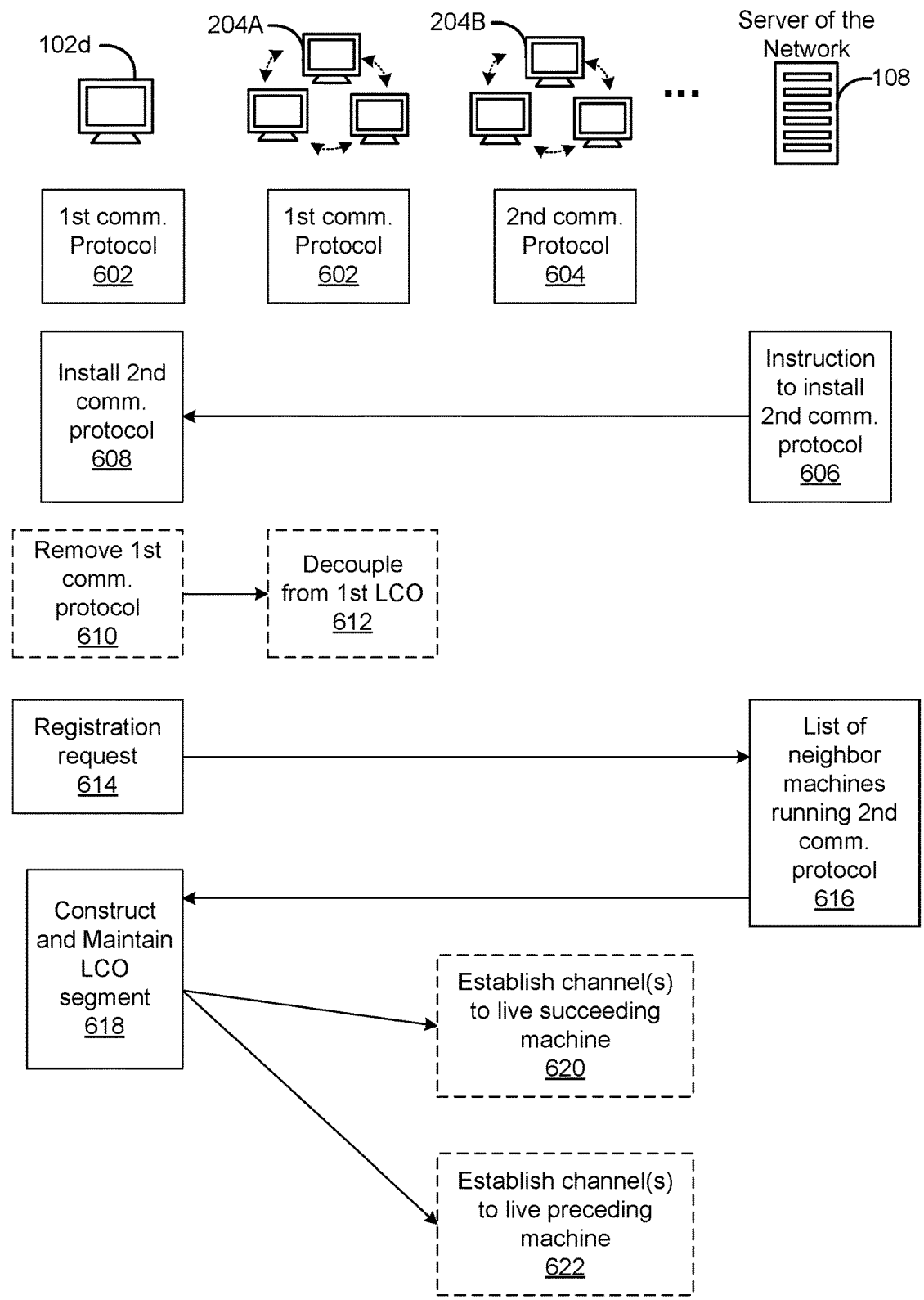
FIG. 6 is a flow chart of a method of network system management, in accordance with some embodiments.

FIG. 6 is a flow diagram illustrating exemplary interactions among an endpoint machine 102 (e.g., machine 102*d*, sometimes called a first client machine 102), two or more existing linear communication orbits (e.g., 204A and 204B), and a central server 108 of a managed network (e.g., a non-static collection of machines). The non-static collection of machines includes a first linear communication orbit 204A comprising a sequence of machines that run the first communication protocol 602 and a second linear communication orbit 204B comprising a sequence of machines that run a second communication protocol 604 distinct from the first communication protocol. The first linear communication orbit 204A includes one or more machines (e.g., at least a head and/or tail machine) directly connected to a server (e.g., server 108). The second linear communication orbit 204B includes one or more machines (e.g., at least a head and/or a tail machine) directly connected to the same respective server (e.g., one server, such as server 108, supports two or more linear communication orbits).

In some embodiments, the second communication protocol differs from the first communication protocol in one or more of the following respects. In some embodiments, while the first communication protocol has a fixed or predefined set of message types and all messages sent using the first communication protocol must be one of those message types, in the second communication protocol, messages are sent using protocol buffers to define the structure of each message, and the set of message types that can be sent is extensible, meaning that new message types can be added without causing devices or nodes that do not have instructions for processing messages having the new message types to fail or otherwise improperly process messages having the new message types.

Figure 7A:
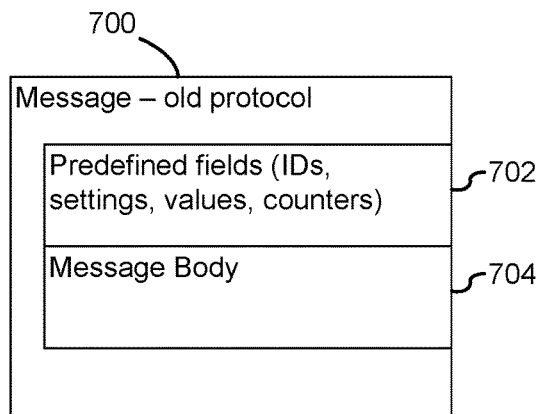
FIG. 7A is a block diagram of a transmitted or received message according to a first communication protocol.
Figure 7B:
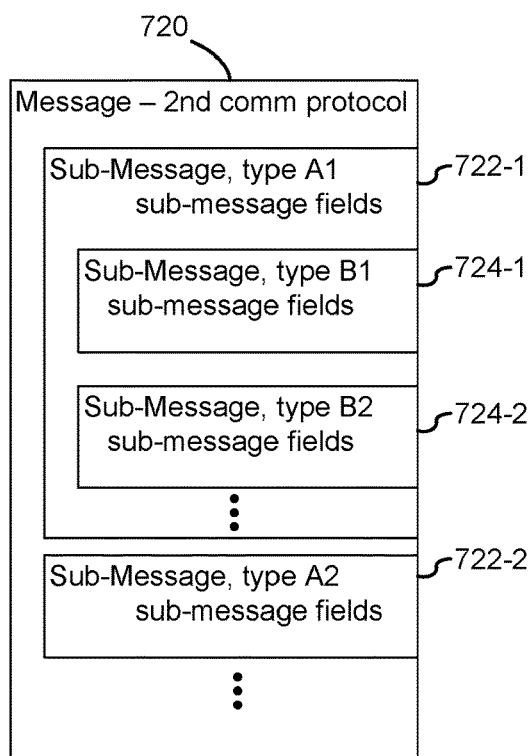
FIG. 7B is a block diagram of a transmitted or received message according to a second communication protocol.

FIG. 7A shows an example of a message 700 sent or received using the first communication protocol. Message 700 has a header 702 with a predefined set of fields, and a message body 704. In some embodiments, each endpoint machine 102 using the first communication protocol includes a library 321 (FIG. 3) or set of definitions for the messages or message types that can be received and/or sent using the first communication protocol. Similarly, FIG. 7B shows an example of a message 720 sent or received using the second communication protocol. Message 720 includes a variable number (one or more) of sub-messages 722 (e.g., sub-messages 722-1, 722-2), each of which can optionally include one or more sub-messages 724 (e.g., 724-1, 724-2). In some embodiments, different types of messages have different numbers of layers or levels of sub-messages. In some embodiments, for at least some message types or sub-message types, the number of layers or levels of lower-level sub-messages is variable, depending on the information being conveyed or requested by the message. In some embodiments, each endpoint machine 102 using the second communication protocol includes a library 321 (FIG. 3) or set of definitions for the messages or message types that can be received and/or sent using the second communication protocol.

In some embodiments, when a machine using the first communication protocol receives a message having an unknown message type (e.g., a message type that is not one of the fixed or predefined set of message types defined by library or set 321 (FIG. 3)), the received message is either deleted or otherwise improperly processed. However, when a machine using the second communication protocol receives a message having an unknown message type, while the content of received message is not processed locally, the message as whole is processed in accordance with instructions applicable to all received messages that are compliant with the second communication protocol. For example, if the message of unknown type received by a respective machine includes one or more parameters indicating that it is to be forwarded to another machine or node along a linear communication orbit, the received message is forwarded to that other machine, even though the respective machine is unable to process the content of the message.

In some embodiments, when a respective machine using the second communication protocol receives a message, and the received message is of a known type, but one or more sub-messages of the received message does not match any of the message type definitions 321 (FIG. 3) known to that respective machine, the respective machine processes those portions, if any, of the message that match message type definitions known to it. In addition, as indicated above, if message type of the received message, or parameters in the received message, indicate that the message is to be forwarded to a next machine in the linear communication orbit on which the respective machine is located, the received message is forwarded by the respective machine to that next machine in the linear communication orbit, even if the message or one or more portions of the message not match any of the message type definitions 321 known to the respective machine. In some embodiments, or in some circumstances, different endpoint machines (e.g., different endpoint machines on the same linear communication orbit, or machines on different linear communication orbits) using the second communication protocol may have different sets of message type definitions 321, and therefore some machines may be able to processing messages or sub-messages that other endpoint machines receiving the same message cannot process.

In some embodiments, messages sent using the first communication protocol include one or more message integrity verification values (so that the message content of such messages can be validated), but are either not encrypted, or are not encrypted in a way that prevents machines or nodes on which the first protocol is installed from being able to read the content of messages sent between other nodes in the network. As a result, messages sent using the first communication protocol can be read by machines or nodes not intended to be the recipients of such messages. However, in some embodiments, each respective message sent using the second communication protocol is encrypted with a session key that is unique to or specific to the sender-receiver pair of machines or nodes between which the respective message is sent. For example, the session keys for each pair of machines that exchange messages may be determined using a mutual authentication method, such as TLS 1.2.

In some embodiments, messages sent using the first communication protocol include one or more message integrity verification values determined using a predefined or fixed public-private key pair, without any mechanism for changing the public-private key pair used for generating and verifying the message integrity verification values in messages. On the other hand, the second communication protocol includes the ability to "rotate among" or otherwise change the keys used to generate and validate message integrity verification values in messages sent using the second communication protocol. In particular, messages sent using the second communication protocol include one or more message integrity verification values as well as one or more indicators of a validation key or validation public-private key-pair used to generate and validate the one or more message integrity verification values. In some embodiments, machines using the second communication protocol change, at predefined times, such as monthly or at other time intervals, the key (e.g., a public or private digital signature generation key) used to generate the message integrity verification values included in sent messages, and use a corresponding key (e.g., a private or public validation key corresponding to the digital signature generation key) to validate the message integrity verification values included in received messages.

In some embodiments, initially, first client machine 102 is connected to (e.g., is a head, tail, or intermediate machine in) the first linear communication orbit 204A and runs communication protocol 602 for communications with server 108 and neighboring machines in the first linear communication orbit 204A. Furthermore, prior to performing the method shown in FIG. 6, server sends to the first client machine 102 (as well as other machines in the first linear communication orbit) instructions and receives responses from the first client machine (as well as other machines in the first linear communication orbit) via the first linear communication orbit, using the first communication protocol.

In the flow diagram, the first client machine receives (606) instruction from a server (e.g., server 108) to install the second communication protocol 604. Upon receipt of the instruction, machine 102 installs (608) the second communication protocol 604.

In some embodiments, subsequent to receiving the aforementioned instruction from the server, machine 102 removes (610) the first communication protocol and decouples (612) from the first linear communication orbit 204A. In some embodiments, installing (608) the second communication protocol 604 includes removing (610) the first communication protocol 604 from machine 102 (the first client machine). In some embodiments, installing (608) the second communication protocol 604 includes installing a library of message type definitions 321 (FIG. 3) for the second communication protocol.

In some embodiments, machine 102 automatically decouples 612 from the first linear communication orbit 204A upon removing the first communication protocol, since removing the first communication protocol results in machine 102 being unable to communicate over the first linear communication orbit with its (former) neighbors. In some embodiments, installing 608 the second communication protocol 604 at the first client machine (e.g., endpoint machine 102) includes the first client machine decoupling from the first linear communication orbit 204A. One of skill in the art will realize that the operation ordering described here is merely for illustration purposes and that other orders of operation are possible for machine 102 regarding the installation of the second communication protocol 604, removal of the first communication protocol 602, decoupling from the first linear communication orbit 204A, registering machine 102 with the server as a machine running the second communication protocol, joining a second linear communication orbit (e.g., by constructing and maintaining segments of the second linear communication orbit that connect machine 102 to upstream and downstream neighbors), etc.

Subsequent to installing the second communication protocol, the first client machine 102 submits 614 a registration request to the server 108. In some embodiments, the registration message includes the first client machine's own unique identifier (e.g., it's IP address or other machine identifier). In some embodiments, the registration message represents a request for information regarding the registering machine's potential neighbors. In some embodiments, machine 102 sends the registration message to server 108 using non-LCO communications module 324 (FIG. 3) and the message includes the IP address of first client machine 102. From the perspective of server 108, subsequent to sending the instruction to install the second communication protocol 604, server 108 receives a registration request from the first client machine, asking to register the first client machine as a user of the second communication protocol.

In some embodiments, in response to the registration request, server 108 registers the first client machine 102 as a machine using the second communication protocol, and furthermore the server 108 sends, and first client machine 102 receives (or obtains) from server 108 contact information of a list 616 of potential neighbors of the first client machine (e.g., in response to machine 102 sending the registration request to the sever, server 108 then provides the list of potential neighbors to machine 102). The list provides one or more potential upstream neighbors (e.g., live preceding machines) and one or more potential downstream neighbors (e.g., live succeeding machines) that have been identified by the server for the new machine. Each potential neighbor machine in the list comprises a machine 102 in the non-static collection of machines that runs the second communication protocol 604 (e.g., each of the potential neighbors is a machine that is already part of the sequence of machines in the second linear communication orbit 204B). In some embodiments, the server identifies the potential neighbors and sorts them according to respective unique identifiers of all machines currently known to be present in the network and their sequential order relative to the respective identifier of the new machine. In some embodiments, server 108 provides this sorted list to machine 102 in response to receiving a registration request from the first client machine 102.

In some embodiments, the server 108 maintains two or more lists of potential neighbors, one for each distinct protocol, where each potential neighbor machine in a respective list runs the same respective communication protocol (e.g., each list of potential neighbors is a list of live machines in a particularly linear communication orbit, where all the machines in the list are machines running the same communication protocol). In some embodiments, a first list maintained by server 108 identifies machines that run the first communication protocol 602, and a second list maintained by server 108 identifies machines that run the second communication protocol 604.

In response to obtaining the contact information, the first client machine proactively constructs and maintains 618 a respective segment of the second linear communication orbit 204B. The respective local segment connects the first client machine 102 to a live succeeding machine and a live preceding machine in the list of potential neighbors.

In some embodiments, the proactively constructing and maintaining 618 include the first client machine 102 proactively establishing (620), in accordance with the second communication protocol, a respective propagation channel from the first client machine to the live succeeding machine upon detecting that said respective propagation channel to the live succeeding machine does not already exit. The first client machine 102 also proactively establishes (622), in accordance with the second communication protocol, a respective reporting channel to the live preceding machine upon detecting that said respective reporting channel to the live preceding machine does not already exist.

Subsequent to sending to the first client machine the contact information, server 108 sends instructions to and receives responses from the first client machine via the second linear communication orbit, using the second communication protocol.

Additional details of proactively constructing a respective segment of the second linear communication orbit are provided below. Upon receipt of the list of potential neighbors from server 108, the first client machine 102 proceeds to search for its nearest live succeeding machine (i.e., its closest downstream neighbor in the second linear communication orbit 204B) based on the potential neighbor contact information obtained from server 108. In some embodiments, the first client machine runs down the list of potential downstream neighbors one by one, until a live succeeding machine (e.g., a machine that is currently part of the second linear communication orbit and is located downstream of a proposed insertion location in the second linear communication orbit for the first client machine 102) is found. In some embodiments, the list of potential downstream neighbors is sorted according to increasing values of their respective identifiers (e.g., IP addresses). Sometimes, the new machine may encounter one or more inactive machines in the list of potential downstream neighbors before finding the nearest live succeeding machine.

Once the first client machine has identified its downstream neighbor the first client machine proactively establishes (620), in accordance with the second communication protocol, a respective propagation channel from the first client to the live succeeding machine (e.g., such as propagation channels 222 shown in FIG. 2). The live succeeding machine accepts the respective propagation channel request from the first client machine 102, and the respective propagation channel is thus established. The respective propagation channel serves as a propagation channel for the first client machine 102 (e.g., for propagation of commands and queries to the live succeeding machine), and as a receiving channel for the live succeeding machine (e.g., for receiving command and queries from the first client machine).

In some embodiments, after (or, alternatively, before) the first client machine 102 establishes the respective propagation channel to its live succeeding machine, the first client machine searches for its nearest live preceding machine. In some embodiments, the first client machine 102 starts the search for its nearest live preceding machine independently of whether the first client machine has already established the respective propagation channel to its live succeeding machine. In some embodiments, the first client machine 102 runs down the list of potential upstream neighbors one by one, until a live upstream machine is found. In some embodiments, the list of potential upstream neighbors is sorted according to decreasing values of their respective identifiers (e.g., IP addresses). Sometimes, the first client machine 102 may encounter one or more inactive machines in the list of potential upstream neighbors before finding the upstream neighbor. The nearest live preceding machine responds to the contact from the first client machine 102.

Once the first client machine 102 has identified its upstream neighbor, the first client machine proactively establishes a respective propagation channel to the upstream neighbor. The predecessor machine accepts the respective propagation channel request from the first client machine, and the respective propagation channel is thus established. The respective propagation channel serves as a reporting channel for the first client machine (e.g., for reporting results generated in response to received commands or queries), and a collection channel for the upstream neighbor of the first client machine (e.g., for receiving results generated by the first client machine, and possibly other machines downstream of the first client machine, in response to received commands or queries).

The respective local segments connect the first client machine 102 to a live succeeding machine, located downstream of the first client machine in a respective linear communication orbit, and a live preceding machine in the list of potential neighbors, located upstream of the first client machine in the respective linear communication orbit.

In some embodiments, the respective local segment includes the first client machine and four distinct communication channels each originating from or terminating at the first client machine 102. The four distinct communication channels include respective receiving and reporting communication channels between the first client machine and the live preceding machine and also respective collection and propagation communication channels between the first client machine and the live succeeding machine.

In some embodiments, the live preceding machine of the first client machine 102 is the server 108 (e.g., the first client machine is or becomes the head machine of a linear communication orbit). In some embodiments, the live succeeding machine of the first client machine 102 is the server 108 (e.g., the first client machine is or becomes the tail machine of a linear communication orbit). In some embodiments, the live preceding machine and the live succeeding machine of the first client machine 102 are both the server 108 (e.g., the first client machine is a singleton machine connected to server).

From the descriptions above, it can be seen that the server's duties with respect to the formation and maintenance of linear communication orbits are light-weight. Essentially, the server accepts connection requests of new machines, and each new machine establishes a respective propagation channel and a backward connection to the server when the new machine first joins the network. The server also keeps a record of all the machines and their communication protocols that have registered with the server. If a machine has not registered with the server, or alternatively has not affirmed its continued participation in communications with its neighboring machines, for a sufficient amount of time, the server removes that machine from the list of known live machines in the network. The server sorts the list of known live machines according to respective unique identifiers of the machines, such that for each given unique identifier, the server can identify a list of one or more potential neighbor machines in the upstream and the downstream direction (e.g., decreasing value and increasing value of the identifiers), respectively. The server also accepts requests for opening new forward and backward connections and terminating existing forward and backward connections from machines (e.g., head machines, tail machines, new machines, and singleton machines) in the network. In some embodiments, the server also maintains an up-to-date list of head machines so that when a new request is issued (for system and security management operations, etc.) it sends the request to all the head machines in the network, which they download and propagate within their respective segments of the network. As a result, the head machines of the linear communication orbits in the network download and propagate the request immediately. Furthermore, because in a typical network the machine-to-machine communications channels are wide open, overall operations latencies of this system (e.g., from transmission of a request by a server to end point machines throughout the network to receipt by the server of acknowledgments or answers from the endpoint machines) are measured in seconds, not hours or days.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

What is claimed is:

1. A method of managing a non-static collection of machines, comprising:
   executing, at a server system, first instructions that maintain registration information of two or more linear communication orbits formed by the non-static collection of machines, wherein:
      the two or more linear communication orbits include at least
         a first linear communication orbit, consisting of a first subset of the non-static collection of machines, wherein the first subset of the non-static collection of machines is self-organized into a first ordered sequence in accordance with a first predefined order of respective unique identifiers of machines in the first subset of the non-static collection of machines, and
         a second linear communication orbit, consisting of a second subset of the non-static collection of machines distinct from the first subset of the non-static collection of machines, wherein the second subset of the non-static collection of machines is self-organized into a second ordered sequence in accordance with a second predefined order of respective unique identifiers of machines in the second subset of the non-static collection of machines, and
      the registration information includes the respective unique identifiers of machines in the first linear communication orbit and the respective unique identifiers of machines in the second linear communication orbit; and
   performing system, security, or network management operations related to one or more of the machines of the non-static collection of machines via at least one of the first and second linear communication orbits;
   wherein,
   a respective linear communication orbit of the first linear communication orbit and second linear communication orbit includes a plurality of machines at intermediate nodes of the respective linear communication orbit; and
   the method includes:
      at each respective machine of two or more of the machines at intermediate nodes of the respective linear communication orbit,
         receiving from a upstream or downstream neighboring machine a system, security, or network message specifying a system, security, or network management operation;
         performing the system, security, or network management operation; and
         transmitting a message corresponding to the system, security, or network operation to a next neighboring machine in the respective linear communication orbit.

2. The method of claim 1, including:
   executing, at the server system, second instructions that maintain a listing of head machines for the two or more linear communication orbits formed by the non-static collection of machines, wherein performing system, security, or network management operations related to one or more machines of the non-static collection of machines includes:
      sending a request for the system, security, or network operations to the at least one of the first and second linear communication orbits, wherein the request is propagated along the at least one of the first and second linear communication orbits.

3. The method of claim 1, including:
   receiving a connection request from a first machine that is a newly joined machine in the non-static collection of machines; and
   in response to receiving the connection request from the first machine:
      establishing a respective upward propagation channel from the first machine to the server system and a respective downward propagation channel from the server system to the first machine.

4. The method of claim 3, including:
   terminating the respective upward propagation channel and the respective downward propagation channel between the server system and the first machine after the first machine has joined at least one of the two or more linear communication orbits.

5. The method of claim 3, including:
   sending instructions to the first machine to install a first communication protocol corresponding to the first linear communication orbit;
   receiving a registration request from the first machine; and
   in response to receiving the registration request, updating the registration information of the first linear communication orbit to include a respective unique identifier of the first machine.

6. The method of claim 3, including:
   sending contact information of a list of potential neighbors of the first machine in the first linear communication orbit to the first machine, wherein the list of potential neighbors include one or more potential upstream neighbors and one or more potential downstream neighbors for the first machine in the first linear communication orbit.

7. The method of claim 1, wherein each of the first linear communication orbit and the second linear communication orbit include at least one downstream propagation channel and at least one upstream propagation channel.

8. The method of claim 1, wherein the first communication orbit uses a first communication protocol for communications among the first subset of the non-static collection of machines, and the second communication orbit uses a second communication protocol that is different from the first communication protocol for communications among the second subset of the non-static collection of machines.

9. The method of claim 1, wherein a pair of adjacent machines in each of the first linear communication orbit and the second linear communication orbit has a corresponding pair of communication channels between the pair of adjacent machines, and the corresponding pair of communication channels provides full-duplex communication between the pair of adjacent machines.

10. The method of claim 1, wherein the server system is a node, or is located at a node, in at least one of the two or more linear communication orbits.

11. A computer system, comprising:
    one or more processors;

one or more communication interfaces for communicating with individual machines in a non-static collection of machines; and memory storing one or more programs for execution by the one or more processors, the one or more programs including instructions for:
  maintaining registration information of two or more linear communication orbits formed by the non-static collection of machines, wherein:
    the two or more linear communication orbits includes at least
      a first linear communication orbit, consisting of a first subset of the non-static collection of machines, wherein the first subset of the non-static collection of machines is self-organized into a first ordered sequence in accordance with a first predefined order of respective unique identifiers of machines in the first subset of the non-static collection of machines, and
      a second linear communication orbit, consisting of a second subset of the non-static collection of machines distinct from the first subset of the non-static collection of machines, wherein the second subset is self-organized into a second ordered sequence in accordance with a second predefined order of respective unique identifiers of machines in the second subset of the non-static collection of machines, and
    the registration information includes the respective unique identifiers of machines in the first linear communication orbit and the respective unique identifiers of machines in the second linear communication orbit; and
  performing system, security, or network management operations related to one or more of the machines of the non-static collection of machines via at least one of the first and second linear communication orbits; wherein,
  a respective linear communication orbit of the first linear communication orbit and second linear communication orbit includes a plurality of machines at intermediate nodes of the respective linear communication orbit; and
    each respective machine of two or more of the machines at intermediate nodes of the respective linear communication orbit is configured to perform operations including:
      receiving from a upstream or downstream neighboring machine a system, security, or network message specifying a system, security, or network management operation;
      performing the system, security, or network management operation; and
      transmitting a message corresponding to the system, security, or network operation to a next neighboring machine in the respective linear communication orbit.

12. The computer system of claim 11, wherein the one or more programs include instructions for:
  maintaining a listing of head machines for the two or more linear communication orbits formed by the non-static collection of machines, wherein performing system, security, or network management operations related to one or more machines of the non-static collection of machines includes:
    sending a request for the system, security, or network operations to the at least one of the first and second linear communication orbits, wherein the request is propagated along the at least one of the first and second linear communication orbits.

13. The computer system of claim 11, wherein the one or more programs include instructions for:
  receiving a connection request from a first machine that is a newly joined machine in the non-static collection of machines; and
  in response to receiving the connection request from the first machine:
    establishing a respective upward propagation channel from the first machine to the computer system and a respective downward propagation channel from the computer system to the first machine.

14. The computer system of claim 13, wherein the one or more programs include instructions for:
  terminating the respective upward propagation channel and the respective downward propagation channel between the computer system and the first machine after the first machine has joined at least one of the two or more linear communication orbits.

15. The computer system of claim 13, wherein the one or more programs include instructions for:
  sending instructions to the first machine to install a first communication protocol corresponding to the first linear communication orbit;
  receiving a registration request from the first machine; and
  in response to receiving the registration request, updating the registration information of the first linear communication orbit to include a respective unique identifier of the first machine.

16. The computer system of claim 13, wherein the one or more programs include instructions for:
  sending contact information of a list of potential neighbors of the first machine in the first linear communication orbit to the first machine, wherein the list of potential neighbors include one or more potential upstream neighbors and one or more potential downstream neighbors for the first machine in the first linear communication orbit.

17. The computer system of claim 11, wherein each of the first linear communication orbit and the second linear communication orbit include at least one downstream propagation channel and at least one upstream propagation channel.

18. The computer system of claim 11, wherein the first communication orbit uses a first communication protocol for communications among the first subset of the non-static collection of machines, and the second communication orbit uses a second communication protocol that is different from the first communication protocol for communications among the second subset of the non-static collection of machines.

19. The computer system of claim 11, wherein a pair of adjacent machines in each of the first linear communication orbit and the second linear communication orbit has a corresponding pair of communication channels between the pair of adjacent machines, and the corresponding pair of communication channels provides full-duplex communication between the pair of adjacent machines.

20. The computer system of claim 11, wherein the computer system is a node, or is located at a node, in at least one of the two or more linear communication orbits.

21. A non-transitory computer-readable medium, having instructions stored thereon that, when executed by a computer system having one or more processors cause the computer system to perform operations comprising:

maintaining registration information of two or more linear communication orbits formed by a non-static collection of machines, wherein:
the two or more linear communication orbits includes at least
a first linear communication orbit, consisting of a first subset of the non-static collection of machines, wherein the first subset of the non-static collection of machines is self-organized into a first ordered sequence in accordance with a first predefined order of respective unique identifiers of machines in the first subset of the non-static collection of machines, and
a second linear communication orbit, consisting of a second subset of the non-static collection of machines distinct from the first subset of the non-static collection of machines, wherein the second subset is self-organized into a second ordered sequence in accordance with a second predefined order of respective unique identifiers of machines in the second subset of the non-static collection of machines, and
the registration information includes the respective unique identifiers of machines in the first linear communication orbit and the respective unique identifiers of machines in the second linear communication orbit; and
performing system, security, or network management operations related to one or more of the machines of the non-static collection of machines via at least one of the first and second linear communication orbits;
wherein,
a respective linear communication orbit of the first linear communication orbit and second linear communication orbit includes a plurality of machines at intermediate nodes of the respective linear communication orbit; and
each respective machine of two or more of the machines at intermediate nodes of the respective linear communication orbit is configured to perform operations including:
receiving from a upstream or downstream neighboring machine a system, security, or network message specifying a system, security, or network management operation;
performing the system, security, or network management operation; and
transmitting a message corresponding to the system, security, or network operation to a next neighboring machine in the respective linear communication orbit.

22. The non-transitory computer-readable medium of claim 21, wherein each respective machine of the two or more of the machines at the intermediate nodes of the respective linear communication orbit is further configured to perform operations that include, after performing the system, security, or network management operation, updating the corresponding message with local updates by the respective machine, and transmitting the updated message to a next neighboring machine in the respective linear communication orbit.

23. The non-transitory computer-readable medium of claim 21, including instructions stored thereon that, when executed by the computer system, cause the computer system to perform operations comprising:

maintaining a listing of head machines for the two or more linear communication orbits formed by the non-static collection of machines, wherein performing system, security, or network management operations related to one or more machines of the non-static collection of machines includes:
sending a request for the system, security, or network operations to the at least one of the first and second linear communication orbits, wherein the request is propagated along the at least one of the first and second linear communication orbits.

24. The non-transitory computer-readable medium of claim 21, including instructions stored thereon that, when executed by the computer system, cause the computer system to perform operations comprising:
receiving a connection request from a first machine that is a newly joined machine in the non-static collection of machines; and
in response to receiving the connection request from the first machine:
establishing a respective upward propagation channel from the first machine to the computer system and a respective downward propagation channel from the computer system to the first machine.

25. The non-transitory computer-readable medium of claim 24, including instructions stored thereon that, when executed by the computer system, cause the computer system to perform operations comprising:
terminating the respective upward propagation channel and the respective downward propagation channel between the computer system and the first machine after the first machine has joined at least one of the two or more linear communication orbits.

26. The non-transitory computer-readable medium of claim 24, including instructions stored thereon that, when executed by the computer system, cause the computer system to perform operations comprising:
sending instructions to the first machine to install a first communication protocol corresponding to the first linear communication orbit;
receiving a registration request from the first machine; and
in response to receiving the registration request, updating the registration information of the first linear communication orbit to include a respective unique identifier of the first machine.

27. The non-transitory computer-readable medium of claim 24, including instructions stored thereon that, when executed by the computer system, cause the computer system to perform operations comprising:
sending contact information of a list of potential neighbors of the first machine in the first linear communication orbit to the first machine, wherein the list of potential neighbors include one or more potential upstream neighbors and one or more potential downstream neighbors for the first machine in the first linear communication orbit.

28. The non-transitory computer-readable medium of claim 21, wherein the computer system is a node, or is located at a node, in at least one of the two or more linear communication orbits.

* * * * *